(12) United States Patent
Sawatari et al.

(10) Patent No.: US 8,009,266 B2
(45) Date of Patent: Aug. 30, 2011

(54) PROCESS FOR PRODUCING LIQUID CRYSTAL DISPLAY

(75) Inventors: Naoko Sawatari, Tokyo-to (JP); Masato Okabe, Tokyo-to (JP)

(73) Assignee: DAI Nippon Printing Co., Ltd., Tokyo-to (JP)

( * ) Notice: Subject to any disclaimer, the term of this patent is extended or adjusted under 35 U.S.C. 154(b) by 267 days.

(21) Appl. No.: 12/514,118

(22) PCT Filed: Nov. 14, 2007

(86) PCT No.: PCT/JP2007/072098
§ 371 (c)(1),
(2), (4) Date: May 8, 2009

(87) PCT Pub. No.: WO2008/059876
PCT Pub. Date: May 22, 2008

(65) Prior Publication Data
US 2010/0060844 A1     Mar. 11, 2010

(30) Foreign Application Priority Data
Nov. 15, 2006   (JP) .................................. 2006-309066

(51) Int. Cl.
*G02F 1/13* (2006.01)
(52) U.S. Cl. ........ 349/187; 349/123; 349/127; 349/128; 349/132; 349/133
(58) Field of Classification Search ........................ None
See application file for complete search history.

(56) References Cited

U.S. PATENT DOCUMENTS
2002/0085153 A1   7/2002  Choi et al.
2006/0146249 A1*  7/2006  Choi .............................. 349/141

FOREIGN PATENT DOCUMENTS
| JP | 02-272426 A | 11/1990 |
| JP | 07-199162 A | 8/1995 |
| JP | 08-106099 A | 4/1996 |
| JP | 08-110524 A | 4/1996 |
| JP | 10-186384 A | 7/1998 |
| JP | 2000-122043 A | 4/2000 |
| JP | 2006-234885 A | 9/2006 |
| JP | 2006-337460 A | 12/2006 |

OTHER PUBLICATIONS

Toshiaki Nonaka, et al; "Material characteristics of an active matrix LCD based upon chiral smectics", Liquid Crystals, 1999, vol. 26, No. 11, pp. 1599-1602.
International Search Report: PCT/JP2007/072098.

* cited by examiner

*Primary Examiner* — Hemang Sanghavi
(74) *Attorney, Agent, or Firm* — Ladas & Parry LLP

(57) ABSTRACT

A process for producing a liquid crystal display having less alignment defects, which seldom causes aligning disorder at the boundary where ferroelectric liquid crystals allowed to flow are brought into contact with each other when the ferroelectric liquid crystals are coated on the substrate flow. The process includes a first alignment layer formation step and a liquid crystal coating step. The liquid crystal coating step is a step of linearly coating the ferroelectric liquid crystals on a first alignment layer of a liquid crystal side substrate in a direction substantially perpendicular or substantially parallel to the alignment treatment direction conducted in the first alignment layer formation step.

9 Claims, 9 Drawing Sheets

BRIGHT

DARK

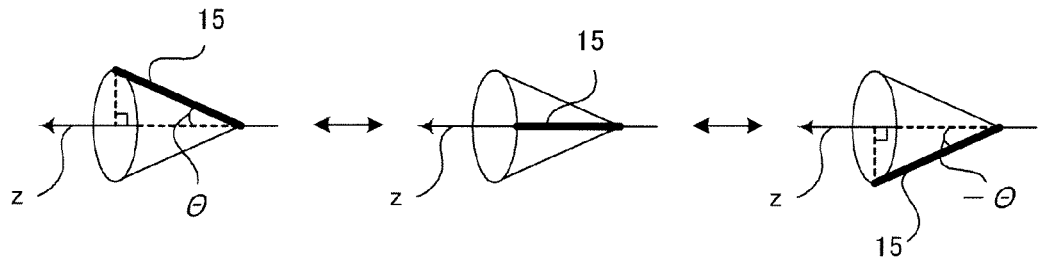
FIG. 9A   FIG. 9B   FIG. 9C
FIG. 10
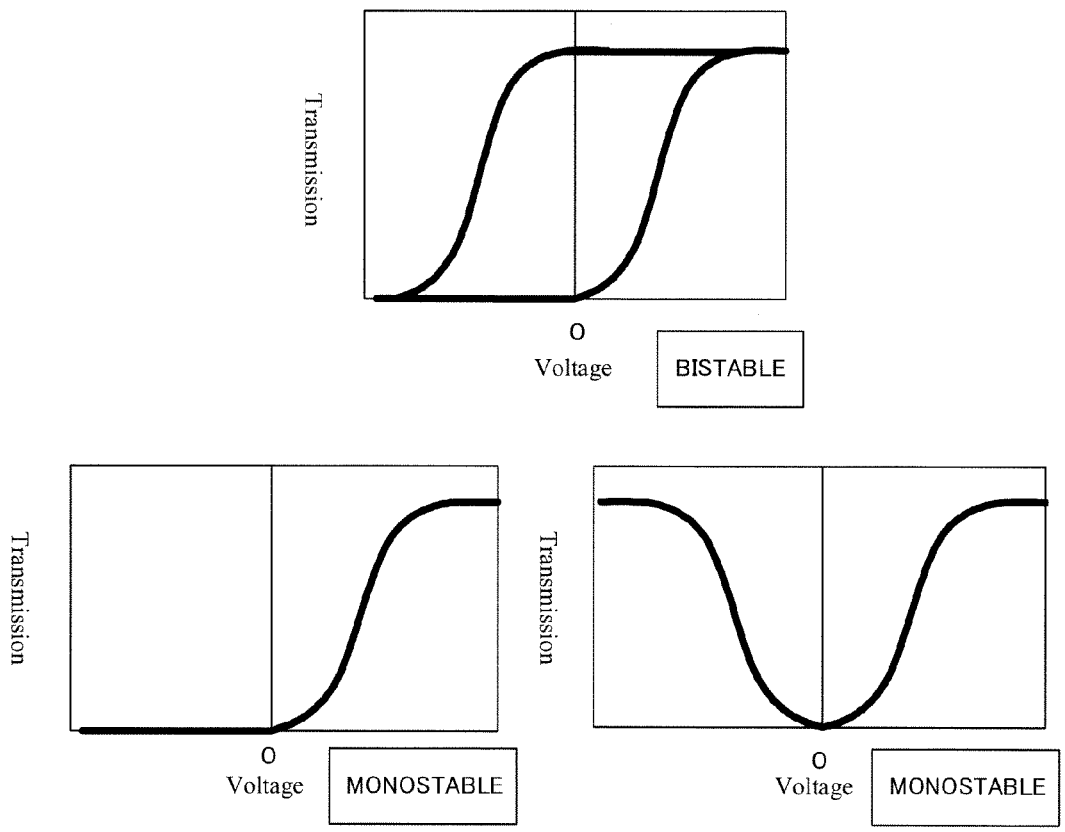

PROCESS FOR PRODUCING LIQUID CRYSTAL DISPLAY

TECHNICAL FIELD

The present invention relates to a process for producing a liquid crystal display using a ferroelectric liquid crystal.

BACKGROUND ART

Since liquid crystal displays have features of being thin, low in power consumption and others, the use thereof has been expanding in various articles from large-sized displays to portable information terminals and the development thereof has been actively made. Conventionally, for liquid crystal displays, a TN system, an STN multiplex driving system, an active matrix driving system in which thin film transistors (TFTs) are used in TN, and others have been developed and made practicable. However, since nematic liquid crystal is used therein, the response speed of the liquid crystal material is as small as several milliseconds to several tens of milliseconds and it cannot be said that these sufficiently cope with display of moving images.

Ferroelectric liquid crystal (FLC) exhibits a very fast response in order of microseconds, and thus FLC is a liquid crystal suitable for high-speed devices. About ferroelectric liquid crystal, there is well known a bistable liquid crystal which has two stable states when no voltage is applied thereto and is suggested by Clark and Lagerwall (FIG. 10 upper graph). However, the liquid crystal has a problem that the liquid crystal has memory properties but gray scale display cannot be attained since the switching thereof is limited to two states, namely, bright and dark states.

In recent years, attention has been paid to ferroelectric liquid crystal in which the liquid crystal layer thereof is stable in a single state (hereinafter referred to as "monostable") when no voltage is applied thereto as a liquid crystal making it possible to attain gray scale display by the matter that the director (the inclination of the molecule axis) of the liquid crystal is continuously changed by a change in applied voltage so as to analogue-modulate the light transmission thereof (Non-Patent Document 1, FIG. 10 lower graphs). As the liquid crystal showing the mono-stability, ferroelectric liquid crystals having the phase change of cholesteric phase (Ch)-chiral smectic C phase (SmC*) without passing through the smectic A (5 mA) phase in the temperature lowering process are generally used (FIG. 2 upper part).

On the other hand, as the ferroelectric liquid crystal, there is a material having the phase change of cholesteric phase (Ch)-smectic A phase (5 mA)-chiral smectic C phase (SmC*) so as to exhibit the SmC* phase via the SmA phase in the temperature lowering process (FIG. 2 lower part). Among the ferroelectric liquid crystal material reported so far, most of them are those having the latter phase sequence of passing through the SmA phase compared with the former material which does not pass through the SmA phase. It is known that the latter ferroelectric liquid crystal having the phase sequence of passing through SmA phase in general has two stable states with respect to one layer normal line so as to show the bi-stability.

The ferroelectric liquid crystals have higher molecular orderliness than nematic liquid crystals and it is therefore difficult to align these ferroelectric liquid crystals. Particularly, in ferroelectric liquid crystals obtained by not passing through the SmA phase, two regions differing in the direction of the layer normal line (hereinafter referred to as "double domain") are generated (Upper part in FIG. 2). Such a double domain brings about white-black inverted displays when the crystal display is driven (FIG. 3), giving rise to a large problem. On the other hand, in ferroelectric liquid crystals obtained by passing through the SmA phase, the layer interval of the smectic layer shrinks during the course of phase change and therefore, the smectic layer has a bent chevron structure to compensate the volume changed by the shrinkage. A domain differing in the direction of the long axis of a liquid crystal molecule depends on the bending direction, causing easy generation of alignment defects called zigzag defects and hairpin defects. Such defects are causes of deteriorated contrast due to light leakage.

In recent years, the One prop Fill (ODF) method has attracted remarkable attention as the method of sealing a liquid crystal. In this method, a sealing agent is coated in frame form in such a manner as to surround a liquid crystal sealing area on one of a pair of substrates, a liquid crystal is dropped on the substrate, then both substrates are laminated on each other in the condition that the pressure between both substrates is decreased sufficiently to bind both substrates with a sealing agent interposed therebetween. The One prop Fill method has the advantage that the time required for the liquid crystal sealing process can be more significantly reduced as compared with the usual vacuum injection method.

As the process for producing a liquid crystal display in the One prop Fill method using a ferroelectric liquid crystal, for example, a method is disclosed in which a liquid crystal solution prepared by dissolving the ferroelectric liquid crystal and a non-liquid crystalline polymer material is coated to one substrate, then, solvents are distilled to form a ferroelectric liquid crystal layer and subsequently, the non-liquid crystal polymer material in the ferroelectric liquid crystal layer is cured (see Patent Document 1). According to this method, since a cured product of the non-liquid crystal polymer material exists as a reinforcing material in the ferroelectric liquid crystal layer, aligning disorder caused by external pressure or the like can be suppressed. However, in Patent Document 1, there is no description concerning the methods of suppressing alignment defects such as a double domain, zigzag defects and hairpin defects.

Further, for example, a method is disclosed in which a mixed solution of a ferroelectric liquid crystal and a polymerizable monomer is coated on one of the substrates to polymerize a polymerizable monomer (see, Patent Document 2 and Patent Document 3). According to this method, the polymerizable monomer molecules are aligned while also, a complex of the ferroelectric liquid crystal and polymerizable monomer is stretched in network form into an anisotropic material, whereby the alignment of the liquid crystal molecules is promoted, making it possible to limit the generation of alignment defects such as zigzag defects. Moreover, like the above method, this method can suppress aligning disorder caused by external pressure.

Patent Document 1: Japanese Patent Application Laid-Open No. 7-199162
Patent Document 2: Japanese Patent Application Laid-Open No. 2000-122043
Patent Document 3: Japanese Patent Application Laid-Open No. 2006-234885
Non-Patent Document 1: NONAKA, T., Li, J., OGAWA, A., HORNUNG, B., SCHMIDT, W., WINGEN, R., and DUBAL, H., 1999, Liq. Cryst., 26, 1599.

SUMMARY OF THE INVENTION

Problem to be Solved by the Invention

In the One prop Fill method, however, when the ferroelectric liquid crystal coated to the substrate flows, the alignment is disarranged at the boundary where the ferroelectric liquid crystals are brought into contact with each other, with the result that there is the case where lines are observed.

For example, Patent Document 3 discloses a method in which when two substrates are attached to each other, a pushing member and the two substrates are relatively moved in specified directions while placing and pushing the pushing member to the substrates to allow a ferroelectric liquid crystal-containing organic material to flow in a specified direction in the condition that the organic material is sandwiched between the two substrates. It is considered, in this method, though the ferroelectric liquid crystals can be aligned in accordance with the direction of the movement of the pushing member and the two substrates, it flows in random directions including the moving direction and the alignment is disarranged at the boundary where the ferroelectric liquid crystals are brought into contact with each other since the ferroelectric liquid crystal is filled between the two substrates as mentioned above.

The present invention has been achieved with a consideration to the above-mentioned circumstances, and a main object thereof is to provide a process for producing a liquid crystal display having less alignment defects, which seldom causes aligning disorder at the boundary where ferroelectric liquid crystals allowed to flow are brought into contact with each other when the coated ferroelectric liquid crystals flow.

Means for Solving the Problems

To attain the object, the present invention provides process for producing a liquid crystal display, the process comprising: a liquid crystal side substrate preparation step including a first alignment layer formation step of forming a first alignment layer-formation layer on a first substrate on which a first electrode layer is formed and subjecting the first alignment layer-formation layer to alignment treatment to form a first alignment layer, to prepare a liquid crystal side substrate in which the first electrode layer and the first alignment layer are laminated in this order on the first substrate; a counter substrate preparation step including a second alignment layer formation step of forming a second alignment layer-formation layer on a second substrate on which a second electrode layer is formed and subjecting the second alignment layer-formation layer to alignment treatment to form a second alignment layer, to prepare a counter substrate in which the second electrode layer and the second alignment layer are laminated in this order on the second substrate; a liquid crystal coating step of linearly coating a ferroelectric liquid crystal to a surface of the first alignment layer of the liquid crystal side substrate in a direction substantially perpendicular or substantially parallel to a direction of the alignment treatment conducted in the first alignment layer formation step; and a substrate attaching step of providing the liquid crystal side substrate to which the ferroelectric liquid crystal is coated and the counter substrate to face each other such that the direction of the alignment treatment conducted in the first alignment layer formation step and a direction of the alignment treatment conducted in the second alignment layer formation step are substantially parallel to each other, and attaching the both substrates.

According to the present invention, the ferroelectric liquid crystal is linearly coated in a direction substantially perpendicular or substantially parallel to the alignment treatment direction in the first alignment layer formation step. This limits the generation of aligning disorder at the boundary where ferroelectric liquid crystals allowed to flow are brought into contact with each other when the coated ferroelectric liquid crystals flow and also, limits the generation of alignment defects such as a double domain.

In the invention, it is preferable that the ferroelectric liquid crystal is warmed to a temperature at which the ferroelectric liquid crystal exhibits a nematic phase or an isotropic phase, before the ferroelectric liquid crystal is coated to the first alignment layer in the liquid crystal coating step; and that a coating method of the ferroelectric liquid crystal is a jetting method. This is because the use of the jetting method ensures that the ferroelectric liquid crystal can be coated in the form of plural straight lines at fixed intervals, thereby making it possible to suppress the aligning disorder at the boundary where the ferroelectric liquid crystals that flow after being coated are brought into contact with each other. It is also because the ferroelectric liquid crystal can be jetted stably by warming the ferroelectric liquid crystal to the above temperature.

At this time, the jetting method is preferably an ink jet method. This is because if the ink jet method is used, the ferroelectric liquid crystal can be coated in the form of serial dots and also in the form of plural linear lines at fixed intervals, with a result that this method can efficiently limit the aligning disorder at the boundary where the ferroelectric liquid crystals that flow after being coated are brought into contact with each other.

In the invention, the method of coating the ferroelectric liquid crystal may be a screen printing method. This is because in the case of using the screen printing method, the ferroelectric liquid crystal can also be coated in the form of plural straight lines at fixed intervals, to suppress the aligning disorder at the boundary where the ferroelectric liquid crystals that flow after being coated are brought into contact with each other.

In the present invention, it is further preferable that the first alignment layer formation step is a step of: forming a layer to form an alignment layer for reactive liquid crystal on the first substrate on which the first electrode layer is formed, subjecting the layer to form an alignment layer for reactive liquid crystal to the alignment treatment to form an alignment layer for reactive liquid crystal, and then fixing a reactive liquid crystal to the alignment layer for reactive liquid crystal to form a fixed liquid crystal layer, characterized in that the alignment layer for reactive liquid crystal and the fixed liquid crystal layer are laminated to form the first alignment layer. This is because the fixed liquid crystal layer can be made to function as the alignment layer that aligns the ferroelectric liquid crystals by aligning the reactive liquid crystal using the alignment layer for reactive liquid crystal and by, for example, polymerizing the reactive liquid crystal to fix the alignment state of the reactive liquid crystal. This is also because the reactive liquid crystal has a structure relatively similar to that of the ferroelectric liquid crystal, there is a strong interaction between the reactive liquid crystal and the ferroelectric liquid crystal and therefore, the alignment of the ferroelectric liquid crystal can be controlled more efficiently than in the case of using only an alignment layer that is a single layer.

In the present invention, the alignment treatment is preferably photo alignment treatment. This is because the photo alignment treatment is non-contact alignment treatment, this method is free from the occurrence of static electricity and dusts and can therefore control the alignment treatment quantitatively.

Moreover, in the present invention, the alignment treatment is preferably rubbing treatment. This is because the alignment layer processed by rubbing treatment can suppress the generation of zigzag defects and hairpin defects.

In the present invention, the constituent materials of the first alignment layer and the second alignment layer have compositions differing from each other with the ferroelectric liquid crystal interposed therebetween. This is because the generation of alignment defects such as a double domain can be suppressed, which makes it possible to obtain mono-domain alignment.

In the present invention, it is further preferable that a linear partition wall formation step of forming plural linear partition walls on the first substrate is carried out prior to the first alignment layer formation step in the liquid crystal side substrate preparation step; the alignment treatment is conducted in a direction substantially perpendicular or substantially parallel to a longitudinal direction of the linear partition wall in the first alignment layer formation step; and the ferroelectric liquid crystal is coated in a form of plural linear lines in the direction substantially parallel to the longitudinal direction of the linear partition wall between the linear partition walls adjacent to each other in the liquid crystal coating step. The formation of the linear partition wall can improve impact resistance. When the longitudinal direction of the linear partition wall and the direction of the alignment treatment and the coating direction of the ferroelectric liquid crystal in the first alignment layer formation step are designed to satisfy the requirements of the relation above and the ferroelectric liquid crystal is coated in the form of plural linear lines between the adjacent linear partition walls, the ferroelectric liquid crystal can be coated in the form of plural linear lines in a direction substantially parallel or substantially perpendicular to the direction of the alignment treatment conducted in the first alignment layer formation step, whereby the generation of alignment defects and aligning disorder can be suppressed.

Effect of the Invention

In the present invention, a ferroelectric liquid crystal is coated in the form of linear lines in a direction substantially perpendicular or substantially parallel to the direction of the alignment treatment conducted in the first alignment layer formation step. Therefore, the present invention produces such an effect that it is possible to suppress the generation of aligning disorder at the boundary where the fluid ferroelectric liquid crystals are brought into contact with each other and also to suppress the generation of alignment defects such as a double domain.

BRIEF DESCRIPTION OF THE DRAWINGS

FIGS. 9A to 9C are each a schematic diagram showing the behavior of the liquid crystal molecule.

FIGS. 10 shows graphical views of changes in transmission to a voltage applied to ferroelectric liquid crystals.

EXPLANATIONS OF THE NUMERALS

Figure 1:
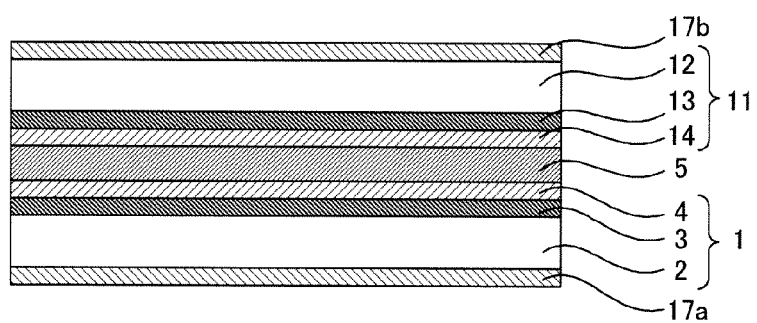
FIG. 1 is a schematic sectional view showing an example of a liquid crystal display obtained by a process for producing a liquid crystal display according to the present invention.

1 Liquid crystal side substrate
2 First substrate
3 First electrode layer
4 First alignment layer
5 Ferroelectric liquid crystal
6 Sealing agent
11 Counter substrate
12 Second substrate
13 Second electrode layer
14 Second alignment layer
15 Liquid crystal molecule
d: Direction of alignment treatment conducted in the first alignment layer formation step
n: Coating direction of the ferroelectric liquid crystal

BEST MODE FOR CARRYING OUT THE INVENTION

The inventors of the present invention have made the following experiments to examine the relationship between the coating method of a ferroelectric liquid crystal, the coating direction of a ferroelectric liquid crystal and the aligning disorder at the boundary where ferroelectric liquid crystals that flow after being coated are brought into contact with each other.

A glass substrate on which an ITO electrode is formed was thoroughly washed and was spin-coated with a transparent resist (trade name: NN780, manufactured by JSR Corporation), which was then dried under reduced pressure and pre-baked at 90° C. for 3 minutes. Then, the glass substrate was exposed to ultraviolet light at a dose of 100 mJ/cm$^2$ through a mask. The substrate was developed by an inorganic alkali solution and subsequently, post-baked at 230° C. for 30 minutes. By the process above, a columnar spacer 1.5 μm in height was formed.

Next, a 2 wt % cyclopentanone solution of a photo dimerization type material (trade name: ROP-103, manufactured by Rolic Technologies Ltd.) was spin-coated to the surface of the substrate on which the columnar spacer was formed, and then dried at 130° C. for 10 minutes. The glass substrate was subsequently irradiated with linearly polarized ultraviolet rays at a dose of about 100 mJ/cm$^2$ at 25° C. to carry out alignment treatment. Moreover, a 2 wt % cyclopentanone solution of a polymerizable liquid crystal material (trade name: ROF-5101, manufactured by Rolic Technologies Ltd.) was laminated on an alignment layer using a photo-dimerization type material by spin coating, dried at 55° C. for 3 minutes and then, irradiated with non-polarized ultraviolet rays at 55° C. at a dose of 1000 mJ/cm$^2$. Thus, a liquid crystal side substrate was obtained.

Next, a glass substrate on which an ITO electrode is formed was thoroughly washed and a 2 wt % cyclopentanone solution of a photo dimerization type material (trade name: ROP-102, manufactured by Rolic Technologies Ltd.) was spin-coated to the surface of the glass substrate and then dried at 130° C. for 15 minutes. The glass substrate was subsequently irradiated with linearly polarized ultraviolet rays at 25° C. at a dose of about 100 mJ/cm² to carry out alignment treatment. A counter substrate was thus obtained.

Then, the liquid crystal side substrate was placed on a single axis stage set to room temperature (23° C.) and ferroelectric liquid crystals (trade name: R2301, manufactured by AZ Electronic Materials) were jetted in the state of an isotropic phase by using an ink jet device (trade name: SE-128, manufactured by Dimatix Inc.) at a frequency of about 3600 Hz for one second while moving the stage at a rate of about 60 mm/second, to form linear lines at intervals of 1 mm. At this time, the coating direction (direction of straight lines of a linear coating pattern) was designed to form angles of 0°, 5°, 10°, 30°, 45°, 60°, 80°, 85° and 90° with the direction of the alignment treatment.

Subsequently, an ultraviolet/heat-curable sealing agent (trade name: WORLD ROCK 718, manufactured by Kyoritsu Chemical & Co., ltd.) was coated to the periphery of this liquid crystal side substrate by using a seal dispenser.

Next, a hot plate disposed in a vacuum chamber was heated to 110° C. and the liquid crystal side substrate on which the ferroelectric liquid crystal was coated was placed on the hot plate. The counter substrate was adsorbed by an adsorbing plate heated to 110° C. and then, the liquid crystal side substrate and the counter substrate were made to face each other such that the directions of the alignment treatment of the alignment layers of these substrates were parallel to each other. Next, the vacuum chamber was evacuated such that the pressure between both substrates was sufficiently reduced and under this condition, both substrates were stuck to each other and fixed pressure was applied to the both, followed by returning the pressure in the vacuum chamber to normal pressure. Then, ultraviolet rays were applied at a dose of 1 J/cm² to cure the ultraviolet-curable type sealing agent, thereby bonding both substrates to each other. Next, the liquid crystal cell was gradually cooled to room temperature to align the ferroelectric liquid crystals. Thus, 9 types of devices for evaluation were produced.

These devices for evaluation were respectively disposed between polarizing plates arranged in Crossed-Nicol to observe. It was found that the devices for evaluation in which the directions of coating of the ferroelectric liquid crystal were 0°, 5°, 85° and 90° with the direction of the alignment treatment conducted in the first alignment layer formation step were confirmed to be mono-stable ferroelectric liquid crystals having uniform mono-domain alignment.

Here, when a ferroelectric liquid crystal in which the ratio of the area of the regions where the normal line has the same direction is 80% or more of all areas, it is defined as "a ferroelectric liquid crystal having a uniform mono-domain alignment".

The area occupied by the regions where the layer normal line has the same direction may be measured in the following manner.

In a liquid crystal display in which, as shown in, for example, FIG. 1, a ferroelectric liquid crystal 5 is held between: a liquid crystal side substrate 1 prepared by laminating a first electrode layer 3 and a first alignment layer 4 on a first substrate 2, and a counter substrate 11 prepared by laminating a second electrode layer 13 and a second alignment layer 14 on a second substrate 12, polarizing plates 17*a* and 17*b* are disposed on the outsides of the liquid crystal side substrate 1 and the counter substrate 11 respectively, wherein light is incident to the polarizing plate 17*a* side and emits from the polarizing plate 17*b* side. These two polarizing plates 17*a* and 17*b* are provided such that the polarization axes of the polarizing plates are substantially perpendicular to each other and the polarization axis of the polarizing plate 17*a* is substantially parallel to the alignment treatment direction (alignment direction of the liquid crystal molecule) of the first alignment layer 4.

Linearly polarized light transmitted through the polarizing plate 17*a* coincides with the alignment direction of the liquid crystal molecule in a non-voltage applied state and therefore, the refractive index anisotropy of the liquid crystal molecule is not developed. The linearly polarized light transmitted through the polarizing plate 17*a* penetrates the liquid crystal molecule as it is and cut by the polarizing plate 17*b*, with the result that the liquid crystal display is turned into a dark state. In a voltage applied state, on the other hand, the liquid crystal molecule moves on the cone, so that linearly polarized light transmitted through the polarizing plate 17*a* forms a specified angle with the alignment direction of the liquid crystal molecule. The linearly polarized light transmitted through the polarizing plate 17*a* becomes elliptically polarized light by the birefringence of the liquid crystal molecule. Among this elliptically polarized light, only linearly polarized light that coincides with the polarization axis of the polarizing plate 17*b* transmits the polarizing plate 17*b*, with the result that the liquid crystal display is turned into a bright state.

As mentioned above, the liquid crystal molecule moves on the cone in a voltage applied state, so that the liquid crystal display is turned into a bright state. However, in the case where an area differing in the direction of the layer normal line exists as is illustrated in the upper part of FIG. 2, the liquid crystal display is partly turned into a dark state as shown in FIG. 3. Therefore, the area occupied by the regions where the layer normal line has the same direction can be calculated from the area ratio of white parts to black parts in a white-black (bright-dark) display obtained when voltage is applied.

In the case of the above devices for evaluation in which the directions of coating of the ferroelectric liquid crystal were 0°, 5°, 85° and 90° with the direction of the alignment treatment conducted in the first alignment layer formation step, the areas occupied by the regions where the layer normal line had the same direction were all 90% or more. On the other hand, in the case of the devices for evaluation in which the directions of coating of the ferroelectric liquid crystal were 10° and 80° with the direction of the alignment treatment conducted in the first alignment layer formation step, double domain alignment was partly observed. In these devices for evaluation, the areas occupied by the regions where the layer normal line had the same direction were both about 70%. In the case of the devices for evaluation in which the directions of coating of the ferroelectric liquid crystal were 30°, 45° and 60° with the direction of the alignment treatment conducted in the first alignment layer formation step, double domain alignment was confirmed. The areas occupied by the regions where the layer normal line had the same direction were both 55% or less.

A 2 wt % cyclopentanone solution of a photo dimerization type material (trade name: ROP-103, manufactured by Rolic Technologies Ltd.) was spin-coated to the surfaces of two glass substrates on which an ITO electrode was formed respectively, at a rotation of 1500 rpm for 15 seconds and then dried at 130° C. for 15 minutes. Then, the glass substrates were irradiated with linearly polarized ultraviolet rays at a dose of about 100 mJ/cm² to carry out alignment treatment.

Then, ferroelectric liquid crystals (trade name: R2301, manufactured by AZ Electronic Materials) were jetted dotwise at intervals of 10 mm on one substrate by using an electromagnetic control type dispenser where the weight of one droplet was adjusted to about 0.15 mg.

Subsequently, an ultraviolet/heat-curable sealing agent (trade name: WORLD ROCK 718, manufactured by Kyoritsu Chemical & Co., ltd.) was coated to the periphery of the substrate coated with the ferroelectric liquid crystal by using a seal dispenser.

Next, a hot plate disposed in a vacuum chamber was heated to 110° C. and the substrate with the ferroelectric liquid crystal coated was placed on the hot plate. Then, the other substrate was adsorbed by an adsorbing plate heated to 110° C. and, the two substrates were made to face each other such that the directions of the alignment treatment of the alignment layers of these substrates were parallel to each other. Next, the vacuum chamber was evacuated such that the pressure between both substrates was sufficiently reduced and under this condition, both substrates were stuck to each other and fixed pressure was applied to the both, followed by returning the pressure in the vacuum chamber to normal pressure. Then, ultraviolet rays were applied at a dose of 1 J/cm$^2$ to cure the ultraviolet-curable type sealing agent, thereby bonding both substrates to each other. Next, the liquid crystal cell was gradually cooled to room temperature to align the ferroelectric liquid crystals.

When the liquid crystal display was disposed between polarizing plates arranged in Crossed-Nicol to observe, lines were observed at the boundary where the ferroelectric liquid crystals that flowed after jetted were brought into contact each other.

From the results of the above experiments, inventors have obtained such teachings that when a ferroelectric liquid crystal is coated in the form of plural linear lines at fixed intervals and also coated in a direction substantially perpendicular or substantially parallel to the direction of the alignment treatment conducted in the first alignment layer formation step, it is possible to suppress the generation of aligning disorder at the boundary where the fluid liquid crystals are brought into contact with each other when the coated ferroelectric liquid crystals flow, and also to suppress the generation of alignment defects such as a double domain.

Hereinafter, a process for producing a liquid crystal display of the present invention will be described in detail.

The process for producing a liquid crystal display of the present invention comprises: a liquid crystal side substrate preparation step including a first alignment layer formation step of forming a first alignment layer-formation layer on a first substrate on which a first electrode layer is formed and subjecting the first alignment layer-formation layer to alignment treatment to form a first alignment layer, to prepare a liquid crystal side substrate in which the first electrode layer and the first alignment layer are laminated in this order on the first substrate; a counter substrate preparation step including a second alignment layer formation step of forming a second alignment layer-formation layer on a second substrate on which a second electrode layer is formed and subjecting the second alignment layer-formation layer to alignment treatment to form a second alignment layer, to prepare a counter substrate in which the second electrode layer and the second alignment layer are laminated in this order on the second substrate; a liquid crystal coating step of linearly coating a ferroelectric liquid crystal to a surface of the first alignment layer of the liquid crystal side substrate in a direction substantially perpendicular or substantially parallel to a direction of the alignment treatment conducted in the first alignment layer formation step; and a substrate attaching step of providing the liquid crystal side substrate to which the ferroelectric liquid crystal is coated and the counter substrate to face each other such that the direction of the alignment treatment conducted in the first alignment layer formation step and a direction of the alignment treatment conducted in the second alignment layer formation step are substantially parallel to each other, and attaching the both substrates.

A process for producing a liquid crystal display according to the present invention will be explained with reference to the drawings.

Figure 4:
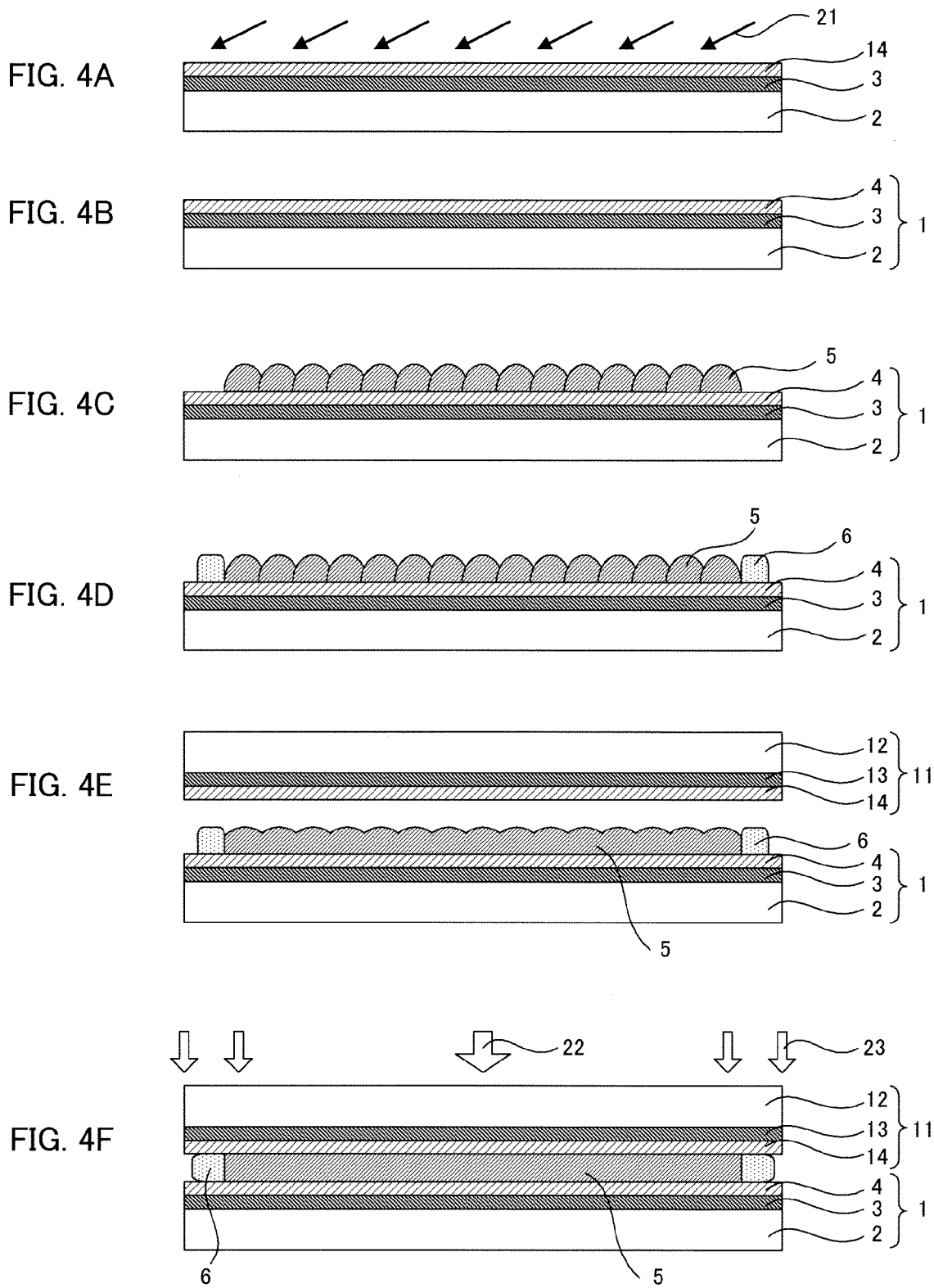
FIGS. 4A to 4F are a process diagram showing an example of a process for producing a liquid crystal display according to the present invention.

FIGS. 4A to 4F are a process diagram showing an example of a process for producing a liquid crystal display according to the present invention. First, a first alignment layer-formation layer 14 is formed on a first substrate 2 on which a first electrode layer 3 is formed and then irradiated with linearly polarized ultraviolet rays 21 to carry out photo alignment treatment, thereby forming a first alignment layer 4 (FIGS. 4A and 4B). A liquid crystal side substrate 1 is thus obtained.

Figure 5:
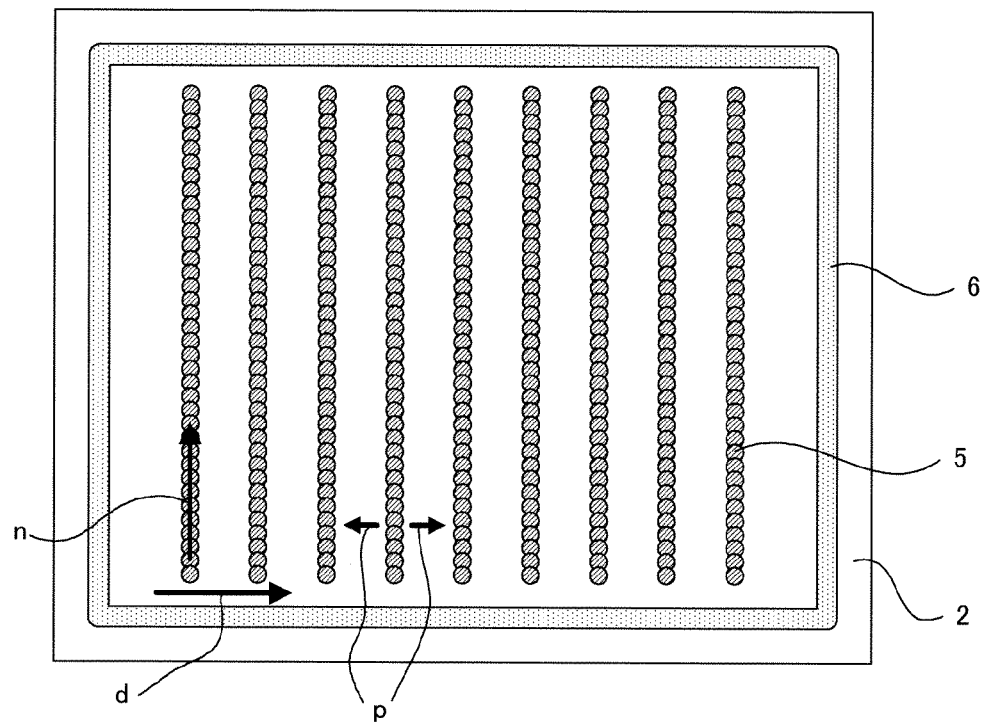
FIG. 5 is a view showing the direction of alignment treatment and the coating direction of a ferroelectric liquid crystal in a first alignment layer formation step.

Then, a ferroelectric liquid crystal 5 is warmed up to the temperature (for example, 100° C.) at which it exhibits an isotropic phase and a ferroelectric liquid crystal 5 is coated by an ink jet device to a first alignment layer 4 in an isotropic phase state in the form of serial dots at equal intervals and plural straight-lines (FIG. 4C, liquid crystal coating step). At this time, as shown in FIG. 5, the coating of the ferroelectric liquid crystal 5 is made to form plural linear lines at fixed intervals in such a manner that the coating direction (direction of a line in a linear coating pattern) n is substantially perpendicular to the direction d of the alignment treatment conducted in the first alignment layer formation step. In FIG. 5, the first electrode layer and the first alignment layer are omitted.

At this time, since the ferroelectric liquid crystal is warmed to the temperature (for example, 100° C.) at which it exhibits an isotropic phase while the liquid crystal side substrate is set to room temperature, the temperature of the liquid crystal side substrate is lower than that of the ferroelectric liquid crystal. The ferroelectric liquid crystal coated to the liquid crystal side substrate is cooled. Generally, a liquid crystal is increased in viscosity as the temperature of the liquid crystal drops. Therefore, the ferroelectric liquid crystal coated to the liquid crystal side substrate is cooled and increased in viscosity, with the result that it does not flow.

Next, a sealing agent 6 is coated to the first alignment layer 4 (FIG. 4D). At this time, as shown in FIG. 5, the sealing agent 6 is coated to the periphery of the first substrate 2 in such a manner as to surround the outside periphery of the region where the ferroelectric liquid crystal 5 is coated.

Then, as shown in FIG. 4E, the liquid crystal side substrate 1 on which the ferroelectric liquid crystal 5 is coated is heated up to the temperature (for example, 110° C.) at which the ferroelectric liquid crystal exhibits an isotropic phase. The ferroelectric liquid crystal coated to the liquid crystal side substrate is thereby warmed into a state of an isotropic phase so that it is reduced in viscosity and flows on the first alignment layer.

Figure 6A:
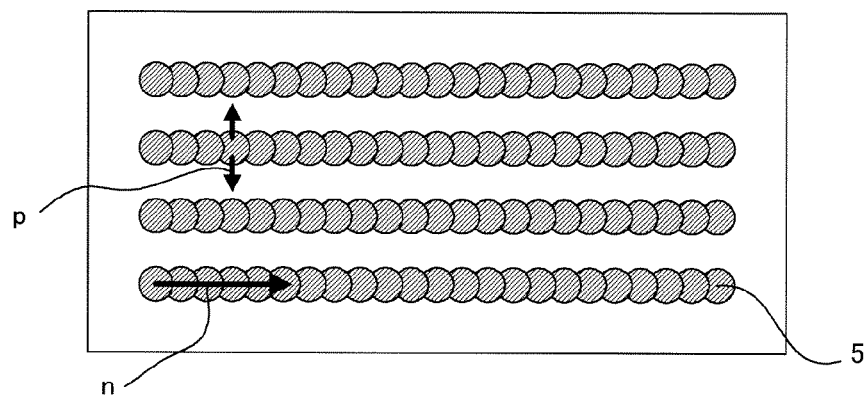
FIGS. 6A and 6B are each a view showing the coating method of a ferroelectric liquid crystal.
Figure 6B:
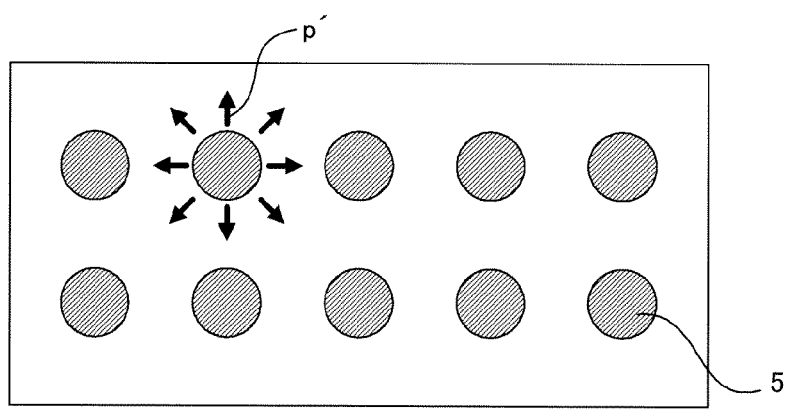

At this time, since the ferroelectric liquid crystal is coated in the form of plural linear lines at fixed intervals, the ferroelectric liquid crystal is naturally limited in its travel direction. When, as shown in, for example, FIG. 6A, the ferroelectric liquid crystal 5 is coated in the form of plural linear lines at fixed intervals, the ferroelectric liquid crystal 5 primarily flows in the direction of the arrow p substantially perpendicular to the coating direction (direction of a line in a linear coating pattern) n of the ferroelectric liquid crystal. When, as shown in FIG. 6B, the ferroelectric liquid crystal 5 is coated in the form of dots, the ferroelectric liquid crystal 5 flows in all directions as shown by the arrow p'. When the ferroelectric liquid crystal is coated in the form of plural linear lines at fixed intervals, the direction of the ferroelectric liquid crystal flows is limited and therefore, the distance at which the ferroelectric liquid crystal flows can be more shortened and the area where the ferroelectric liquid crystal spreads can be reduced compared to in the case of coating the ferroelectric liquid crystal in the form of dots. This method therefore can suppress the generation of aligning disorder at the boundary where the flowed ferroelectric liquid crystals that flow are brought into contact with each other.

Figure 7:
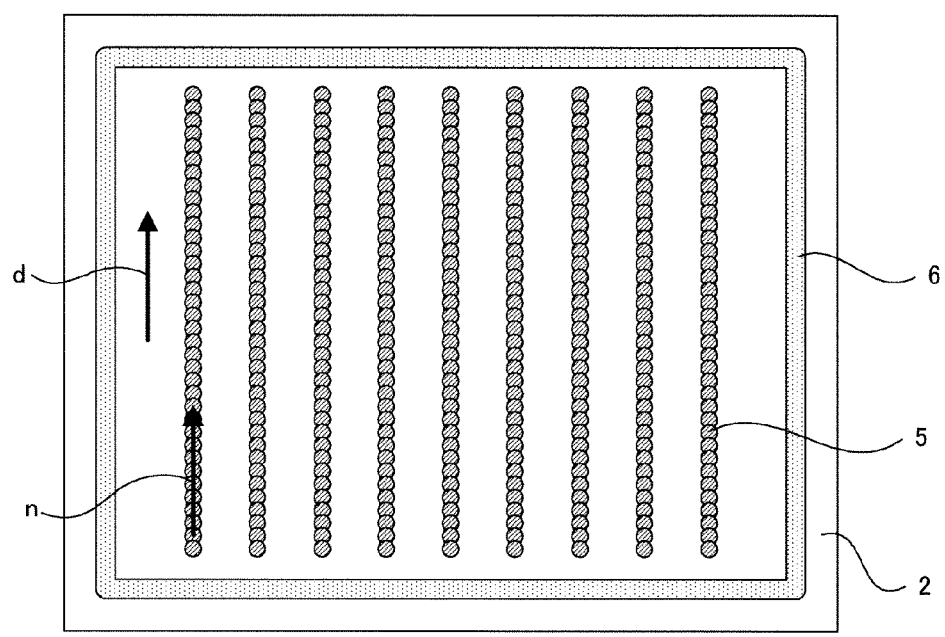
FIG. 7 is a view showing the direction of alignment treatment and the coating direction of a ferroelectric liquid crystal in a first alignment layer formation step.

In an example shown in FIG. 5, the ferroelectric liquid crystal 5 is coated in a direction substantially perpendicular to the direction d of the alignment treatment conducted in the first alignment layer formation step. However, the ferroelectric liquid crystal 5 may be coated in a direction substantially parallel to the direction d of the alignment treatment conducted in the first alignment layer formation step, as shown in FIG. 7. In other words, the angle formed between the direction d of the alignment treatment conducted in the first alignment layer formation step and the coating direction (direction of a line in a linear coating pattern) n of the ferroelectric liquid crystal may be substantially perpendicular as shown in FIG. 5, or may be substantially parallel as shown in FIG. 7. When the ferroelectric liquid crystal is coated in a direction substantially perpendicular or substantially parallel to the direction of the alignment treatment conducted in the first alignment layer formation step in this manner, the generation of alignment defects such as a double domain can be suppressed. Although the reason is yet to be clarified, the results of the above experiments show that there is a tendency that the generation of alignment defects such as a double domain is suppressed when the ferroelectric liquid crystal is coated in a direction substantially perpendicular or substantially parallel to the direction of the alignment treatment conducted in the first alignment layer formation step.

When, as shown in, for example, FIG. 5, the coating direction n of the ferroelectric liquid crystal is substantially perpendicular to the direction d of the alignment treatment conducted in the first alignment layer formation step, the ferroelectric liquid crystal is limited in the direction of flow and therefore, the ferroelectric liquid crystal 5 is induced to flow primarily in the direction of the arrow p, substantially perpendicular to the coating direction (direction of a line in a linear coating pattern) n of the ferroelectric liquid crystal, that is, in a direction substantially parallel to the direction d of the alignment treatment conducted in the first alignment layer formation step. It is considered that this structure improves the alignment ability of the ferroelectric liquid crystal, whereby the generation of alignment defects such as a double domain can be suppressed.

Next, though not illustrated, a second alignment layer-formation layer is formed on a second substrate on which a second electrode layer is formed and the second alignment layer-formation layer is irradiated with linearly polarized ultraviolet rays to carry out photo alignment treatment, thereby forming the second alignment layer to prepare a counter substrate.

Then, as shown in FIG. 4E, the liquid crystal side substrate 1 on which the ferroelectric liquid crystal 5 is coated and the counter substrate 11 are provided to face each other such that the directions of the alignment treatments of the first alignment layer 4 and second alignment layer 14 are substantially parallel to each other. At this time, not only the liquid crystal side substrate 1 but also the counter substrate 11 is heated to the temperature (for example, 110° C.) at which the ferroelectric liquid crystal exhibits an isotropic phase.

Next, as shown in FIG. 4F, the pressure between the liquid crystal side substrate 1 and the counter substrate 11 is sufficiently reduced. Under reduced pressure, the liquid crystal side substrate 1 and the counter substrate 11 are laminated on each other and a prescribed pressure 22 is applied to the both to make the cell gap uniform. In succession, the system is returned to normal pressure to thereby apply further pressure to between the liquid crystal side substrate 1 and the counter substrate 11. Then, the region to which the sealing agent 6 is coated is irradiated with ultraviolet rays 23 to cure the sealing agent 6, thereby bonding the liquid crystal side substrate 1 to the counter substrate 11 (substrate attaching step).

After that, though not shown, the substrates were cooled gradually to room temperature to align the sealed ferroelectric liquid crystal.

Each step in the process for producing a liquid crystal display according to the present invention will be explained.

1. Step of Preparing a Liquid Crystal Side Substrate

The step of preparing a liquid crystal side substrate is a step which includes a first alignment layer formation step in which a first alignment layer-formation layer is formed on a first substrate on which a first electrode layer is formed and the first alignment layer-formation layer is processed by alignment treatment to form a first alignment layer, thereby preparing a liquid crystal side substrate in which the first electrode layer and the first alignment layer are formed in this order on the first substrate.

Each step in this liquid crystal side substrate preparation step will be explained.

(1) First Alignment Formation Step

The first alignment layer formation step in the present invention is a step in which the first alignment layer-formation layer is formed on the first substrate on which the first electrode layer is formed, and the first alignment layer-formation layer is subjected to alignment treatment to form the first alignment layer.

In the first alignment layer formation step, an alignment layer which is a single layer may be formed. Also, an alignment layer for reactive liquid crystal may be formed and a fixed liquid crystal layer obtained by fixing a reactive liquid crystal to this alignment layer for reactive liquid crystal may be formed on this alignment layer for reactive liquid crystal. These two embodiments will be explained separately.

(i) First Embodiment

The first alignment layer formation step in this embodiment is a step in which the first alignment layer-formation layer is formed on the first substrate on which the first electrode layer is formed and the first alignment layer-formation layer is subjected to alignment treatment to form the first alignment layer. This is a step of forming an alignment layer constituted of a single layer as the first alignment layer.

No particular limitation is imposed on the method of forming the first alignment layer insofar as it is a method having the possibility of obtaining the first alignment layer enabling the ferroelectric liquid crystal to be aligned. For example, the first alignment layer-formation layer may be formed on the first electrode layer and the first alignment layer-formation layer may be processed by a treatment such as rubbing treatment or photo alignment treatment to form the first alignment layer.

In particular, it is preferable to process the first alignment layer-formation layer by photo alignment treatment to form the first alignment layer. This is because when the first alignment layer is processed by photo alignment treatment, the alignment of the ferroelectric liquid crystal can be efficiently controlled. It is also because the photo alignment treatment is non-contact alignment treatment, and therefore this method is useful in the point that it is free from the occurrence of static electricity and dusts and can control the alignment treatment quantitatively.

Moreover, it is preferable to also process the first alignment layer-formation layer by rubbing treatment to form the first alignment layer.

In general, the ferroelectric liquid crystal having the phase sequence passing through SmA phase has the layer interval of the smectic layer shorten in the phase change process so as to have a chevron structure with the smectic layer bent for compensating the volume change. According to the bent direction, a domain having a different longer axis direction of the liquid crystal molecule is formed so as to easily generate the alignment defect called the zigzag defect or the hairpin defect in the boundary surface, and thus it is problematic. It is effective to enlarge the pretilt angle to prevent the generation of such zigzag defect or the hairpin defect.

In general, rubbing treatment can realize a larger pretilt angle compare to that of photo alignment treatment. Therefore, by conducting rubbing treatment, generation of zigzag defect or the hairpin defect can be restrained.

In the following, a method of forming the first alignment layer by processing the first alignment layer-formation layer with photo alignment treatment and a method of forming the first alignment layer by carrying out rubbing treatment on the first alignment layer-formation layer are described.

a. Photo Alignment Treatment

In the case of processing the first alignment layer-formation layer by photo alignment treatment to form the first alignment layer, a photo alignment material is coated to the surface of the first electrode layer to form the first alignment layer-formation layer and the first alignment layer-formation layer is irradiated with light controlled in polarization to cause a photo-excitation reaction (decomposition, isomerization and dimerization), thereby imparting anisotropy to the first alignment layer-formation layer to form the first alignment layer.

The photo alignment material used in the present invention is not particularly limited as long as it has the effect of aligning the ferroelectric liquid crystal by generating the photo-excitation reaction by directing a light beam (photoaligning). Such photo alignment materials can be roughly classified into the photoreactive type materials to impart anisotropy to the photo alignment layer by generating the photoreaction and the photo-isomerizable type materials to impart anisotropy to the photo alignment layer by generating the photo-isomerization reaction.

Hereinafter, each of the photoreactive type material and the photo-isomerization type material will be explained.

(Photoreactive Type Material)

First, the photoreactive type materials used in the present invention are not limited as long as they are materials to impart anisotropy to the alignment layer by generating the photoreaction. However, it is preferable to be a material to provide anisotropy to an alignment layer by generating the photo-dimerization reaction or the photo-decomposition reaction.

The photo-dimerization reaction is a reaction that two molecules are polymerized by radical polymerization of their reactive sites aligned in the direction of polarization through the light irradiation. This reaction makes it possible to stabilize the alignment in the polarization direction to impart anisotropy to the alignment layer. On the other hand, the photo-decomposition reaction is a reaction which decomposes a molecule chain of polyimide or the like which is aligned in the direction of polarization by the light irradiation. This reaction makes it possible to impart anisotropy to the alignment layer in the state that the molecule chain aligned in the direction perpendicular to the polarization direction remains. It is more preferable in the invention to use, out of these photoreactive materials, photo-dimerization type materials which impart anisotropy to the alignment layer by the photo-dimerization reaction since the materials are high in exposure sensitivity and the scope of material-selection is wide.

The photo-dimerization type material is not limited to any especial kind if the material can impart anisotropy to the alignment layer by photo-dimerization reaction. The material preferably comprises a photo-dimerization-reactive compound having a radically-polymerizable functional group and showing dichroism having different absorptions depending on the polarization direction thereof. This is because the alignment of the photo-dimerization-reactive compound is stabilized and anisotropy can easily be imparted to the alignment layer by radically-polymerizing its reactive sites aligned in the polarization direction.

Examples of the photo-dimerization-reactive compound having such properties include dimerization-reactive polymers each having, as its side chain, at least one reactive site selected from cinnamic acid ester, coumarin, quinoline, a chalcone group and a cinnamoyl group.

Of these, the following is preferred as the photo-dimerization-reactive compound having such properties: a dimerization-reactive polymer having, as its side chain, any one of cinnamic acid ester, coumarin and quinoline. This is because the compound is radically-polymerized in the state that the double bonds in the α,β-unsaturated ketone aligned in the polarization direction function as reactive sites, whereby anisotropy can easily be imparted to the alignment layer.

The main chain of the dimerization-reactive polymer is not limited to any especial kind if the main chain is a chain that is generally known as a polymer main chain, and is preferably a chain which does not have a substituent containing many π electrons, which hinder interactions between the reactive sites of the above-mentioned side chain, an example of the substituent being an aromatic hydrocarbon group.

The weight-average molecular weight of the dimerization-reactive polymer is not especially limited, and is preferably from 5,000 to 40,000, more preferably from 10,000 to 20,000. The weight-average molecular weight can be measured by gel permeation chromatography (GPC). If the weight-average molecular weight of the dimerization-reactive polymer is too small, an appropriate anisotropy may not be imparted to the alignment layer. Conversely, if it is too large, the viscosity of the coating solution at the time of the formation of the first alignment layer is so high that a homogeneous coat film may not easily be formed.

As the dimerization-reactive polymer, a compound represented by the following formula (1) can be illustrated:

[Chemical Formula 1]

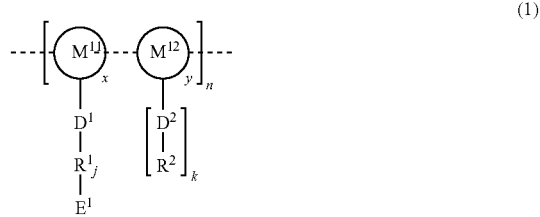

In the formula (1), $M^{11}$ and $M^{12}$ each independently represent a monomer unit of a homopolymer or a copolymer. Examples thereof include ethylene, acrylate, methacrylate, 2-chloroacrylate, acrylamide, methacrylamide, 2-chloroacrylamide, styrene derivatives, maleic acid derivatives, and siloxane. $M^{12}$ may be acrylonitrile, methacrylonitrile, methacrylate, methyl methacrylate, hydroxyalkyl acrylate or hydroxyalkyl methacrylate; x and y each represent the mole ratio of each of the monomer units when the units are polymerized into a copolymer, and are each a number satisfying: $0<x\leq1$, $0\leq y<1$, and $x+y=1$; and n represents an integer of 4 to 30,000. $D^1$ and $D^2$ each represent a spacer unit.

$R^1$ is a group represented by -$A^1$-$(Z^1$—$B^1)_z$—$Z^2$-, and $R^2$ is a group represented by -$A^1$-$(Z^1$-$B^1)_z$—$Z^3$-, in which $A^1$ and $B^1$ each independently represent a covalent single bond, pyridine-2,5-diyl, pyrimidine-2,5-diyl, 1,4-cyclohexylene, 1,3-dioxane-2,5-diyl, or 1,4-phenylene which may have a substituent; $Z^1$ and $Z^2$ each independently represent a covalent single bond, —$CH_2$—$CH_2$—, —$CH_2O$—, —$OCH_2$—, —CONR—, —RNCO—, —COO— or —OOC—, in which R is a hydrogen atom or a lower alkyl group; $Z^3$ is a hydrogen atom, alkyl or alkoxy which has 1 to 12 carbon atoms and may have a substituent, cyano, nitro or halogen; z is an integer of 0 to 4; $E^1$ represents a photo dimerization-reactive site, examples of which include cinnamic acid ester, coumarin, quinoline, a chalcone group and a cinnamoyl group; and j and k are each independently 0 or 1.

As the dimerization-reactive polymer, include compounds represented by the following formulae (2) to (5) can be specifically cited:

[Chemical Formula 2]

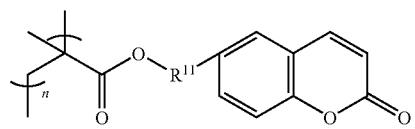
(2)

[Chemical Formula 3]

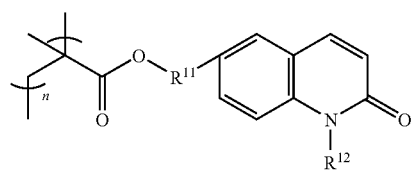
(3)

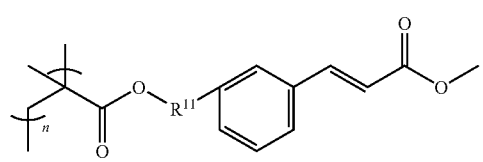
(4)

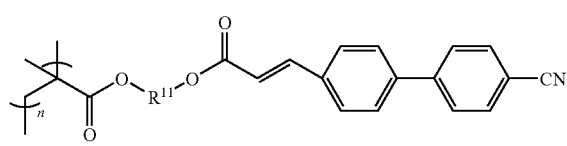
(5)

$R^{11}$: —$A^{11}$—$(Z^{11}$—$B^{11})_t$—$Z^{12}$ in which $A^{11}$ and $B^{11}$: 1,4-phenylene, a covalent single bond, pyridine-2,5-diyl, pyrimidine-2,5-diyl, 1,4-cyclohexylene or 1,3-dioxane-2,5-diyl;

$Z^{11}$ and $Z^{12}$: —$CH_2$—$CH_2$—, —COO—, —OOC—, or a covalent single bond;

t: an integer of 0 to 4;

$R^{12}$: a lower alkyl; and n: an integer of 4 to 30,000.

As the above-mentioned dimerization-reactive polymers, the compounds (6) to (9) represented by the following formulae can be cited as specific examples:

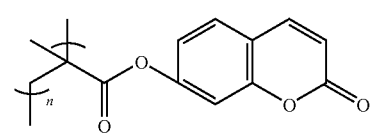
(6)

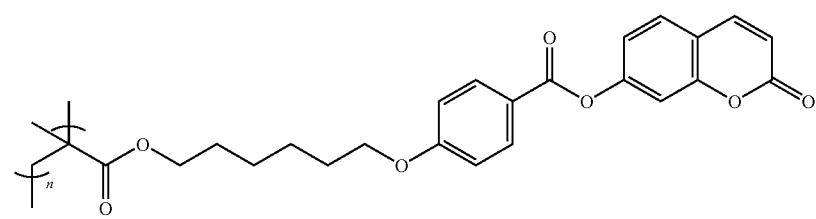
(7)

-continued

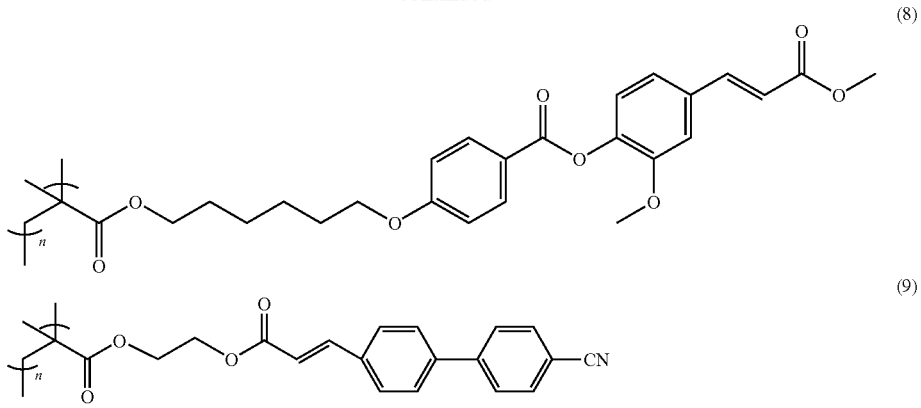

(8)

(9)

A photo dimerization-reactive site or substituent can be variously selected as the photo-dimerization-reactive compound from the above-mentioned compounds in accordance with required properties. One kind of the photo-dimerization-reactive compound may be used alone or a combination of two or more kinds thereof can be used.

The photo-dimerization type material may contain additives besides the above-mentioned photo-dimerization-reactive compound as long as the photoaligning of the alignment layer is not hindered. Examples of the additives include a polymerization initiator and a polymerization inhibitor.

It is advisable to select the polymerization initiator or the polymerization inhibitor appropriately from generally-known compounds in accordance with the kind of the photo-dimerization-reactive compound and then use the selected one. The added amount of the polymerization initiator or the polymerization inhibitor is preferably from 0.001 to 20% by weight, more preferably from 0.1 to 5% by weight of the photo-dimerization-reactive compound. If the added amount of the polymerization initiator or the polymerization inhibitor is too small, the polymerization may not be initiated (or inhibited). Conversely, if the amount is too large, the reaction may be hindered.

As the photoreactive type material utilizing the photo-decomposing reaction, for example, polyimide "RN1199" manufactured by NISSAN CHEMICAL INDUSTRIES, LTD., or the like can be presented.

The wavelength range of light which the photo-reaction type material causes photo-excitation reaction is preferably within the wavelength range of ultraviolet rays, that is, the range of 10 nm to 400 nm, more preferably within the range of 250 nm to 380 nm.

(Photo-Isomerization Type)

The photo-isomerization type material used in the present invention is not particularly limited as long as it is a material to impart anisotropy to the alignment layer by generating the photo-isomerization reaction. Those including the photo-isomerization-reactive compound to impart anisotropy to the photo alignment layer by generating the photo-isomerization reaction are preferable. Since such a photo-isomerization-reactive compound is included, stable isomers are increased out of a plurality of isomers by the light irradiation, and thereby anisotropy can be imparted easily to the alignment layer.

The photo-isomerization-reactive compound is not limited to any especial kind if the compound is a material having such properties mentioned above, and is preferably a compound which shows dichroism having different absorptions depending on the polarization direction thereof and generates photo-isomerization reaction by the light irradiation. By generating the isomerization of the reactive site aligned in the polarization direction of the photo-isomerization-reactive compound having such properties, anisotropy can easily be imparted to the alignment layer.

For the photo-isomerization reaction generated by the photo-isomerization-reactive compound is preferably the cis-trans isomerization reaction. This is because any one of the cis-isomer and the trans-isomer increases by the light irradiation, whereby anisotropy can be imparted to the alignment layer.

Examples of the photo-isomerization-reactive compound used in the invention may be monomolecular compounds or polymerizable monomers polymerizable with light or heat. These should be appropriately selected in accordance with the kind of the used ferroelectric liquid crystal. It is preferable to use any one of the polymerizable monomers since the monomer imparts anisotropy to the alignment layer by the light irradiation and subsequently the monomer is polymerized, whereby the anisotropy can be made stable. Of such polymerizable monomers, preferable is an acrylate monomer or a methacrylate monomer since the monomer imparts anisotropy to the alignment layer and subsequently the monomer can easily be polymerized in the state that the anisotropy is kept good.

The polymerizable monomer may be a monofunctional monomer or a polyfunctional monomer. A bifunctional monomer is preferable since anisotropy of the alignment layer, based on the polymerization, becomes more stable.

Specific examples of such photo-isomerization-reactive compound include compounds having a cis-trans isomerization-reactive skeleton, such as an azobenzene skeleton or a stilbene skeleton.

In this case, the number of the cis-trans isomerization-reactive skeleton(s) contained in a molecule may be one or more, and is preferably two since the alignment of the ferroelectric liquid crystal is easily controlled.

The cis-trans isomerization-reactive skeleton(s) may have a substituent in order to make interaction thereof with the liquid crystal molecules higher. The substituent is not limited to any especial kind if the substituent can make the interaction with the liquid crystal molecules high and further does not hinder the alignment of the cis-trans isomerization-reactive skeleton (s). Examples thereof include a carboxyl group, a sodium sulfonate group, and a hydroxyl group. These skeleton structures can be appropriately selected in accordance with the kind of the used ferroelectric liquid crystal.

The photo-isomerization-reactive compound may have a group containing many π electrons in the molecule, such as an aromatic hydrocarbon group, besides the cis-trans isomerization-reactive skeleton in order to make the interaction with the liquid crystal molecules higher. The cis-trans isomerization-reactive skeleton and the aromatic hydrocarbon group may be bonded to each other through a bonding group. The bonding group is not limited to any especial kind if the group can make the interaction with the liquid crystal molecules high.

Hereinafter, the reason why anisotropy can be imparted to the alignment layer by generating the photo-isomerization reaction with the azobenzene skeleton will be explained. First, when the azobenzene skeleton is irradiated with linearly polarized ultraviolet rays, the azobenzene skeleton of a trans isomer, as shown in the below formula, in which its molecule long axis is aligned in the polarization direction, is changed to the cis isomer thereof.

[Chemical Formula 4]

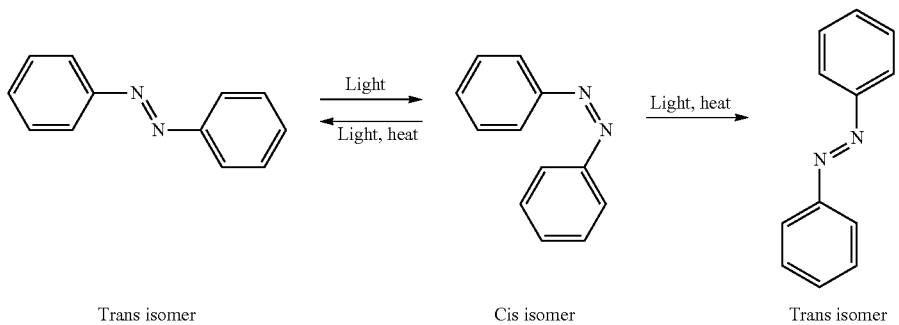

Trans isomer          Cis isomer          Trans isomer

Examples thereof include —COO—, —OCO—, —O—, —C≡C—, —CH$_2$CH$_2$—, —CH$_2$O—, and —OCH$_2$—.

In the case of using a polymerizable monomer as the photo-isomerization-reactive compound, it is preferable that the monomer has, as its side chain, the above-mentioned cis-trans isomerization-reactive skeleton. When the monomer has, as its side chain, the cis-trans isomerization-reactive skeleton, the advantageous effect of anisotropy imparted to the alignment layer becomes larger and this compound becomes particularly suitable for the control of the alignment of the ferroelectric liquid crystal. In this case, it is preferable that the above-mentioned aromatic hydrocarbon group and the bonding group contained in the molecule are contained, together with the cis-trans isomerization-reactive skeleton, in the side chain so as to make the interaction with the liquid crystal molecules high.

The side chain of the polymerizable monomer may have, as a spacer, an aliphatic hydrocarbon group such as an alkylene group so that the cis-trans isomerization-reactive skeleton can easily be aligned.

Since the cis isomer of the azobenzene skeleton is more chemically unstable than trans isomers thereof, the cis isomer returns thermally to any one of the trans isomers or absorbs visible rays to return thereto. At this time, it happens with the same possibility whether the cis isomer turns to the trans isomer at the left side or the trans isomer at the right side in above formula. Accordingly, when the azobenzene skeleton continues to absorb ultraviolet rays, the ratio of the trans isomer at the right side increases so that the average alignment direction of the azobenzene skeleton becomes perpendicular to the polarized ultraviolet ray direction. In the present invention, this phenomenon is used to make alignment directions of azobenzene skeletons consistent with each other, thereby imparting anisotropy to the alignment layer to control the alignment of liquid crystal molecules on the layer.

An example of a monomolecular compound out of the compounds each having in the molecule thereof an azobenzene skeleton may be a compound represented by the following formula (10):

[Chemical Formula 5]

(10)

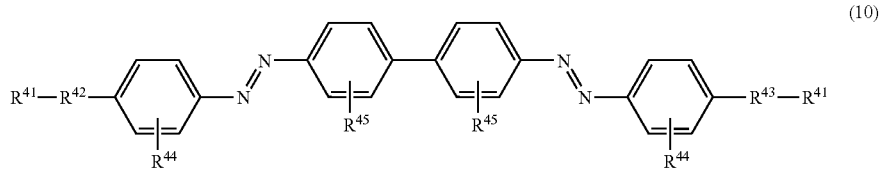

Of the above-mentioned photo-isomerization-reactive compounds of monomolecular compounds and polymerizable monomers, any compound having in the molecule thereof an azobenzene skeleton is preferable as the photo-isomerization-reactive compound used in the present invention. This is because the azobenzene skeleton interacts highly with the liquid crystal molecules and is particularly suitable for the control of the alignment of the ferroelectric liquid crystal since the skeleton contains many π electrons.

In the above formula (10), each $R^{41}$ independently represent a hydroxy group; $R^{42}$ represents a linking group represented by -$(A^{41}\text{-}B^{41}\text{-}A^{41})_m$-$(D^{41})_n$- and $R^{43}$ represents a linking group represented by $(D^{41})_n$-$(A^{41}\text{-}B^{41}\text{-}A^{41})_m$-, in which $A^{41}$ represents a bivalent hydrocarbon group, $B^{41}$ represents —O—, —COO—, —OCO—, —CONH—, —NHCO—, —NHCOO— or —OCONH—, m represents an integer of 0 to 3, $D^{41}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1; each $R^{44}$ independently represents a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt; and each $R^{45}$ independently represents a carboxy group, a sulfo group, a nitro group, an amino group or a hydroxy group provided that the carboxy group or the sulfo group may be combined with an alkali metal to form a salt.

Specific examples of the compound represented by the above-mentioned formula (10) include the following compounds (11) to (14):

[Chemical Formula 6]

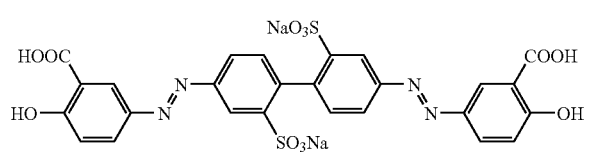

(11)

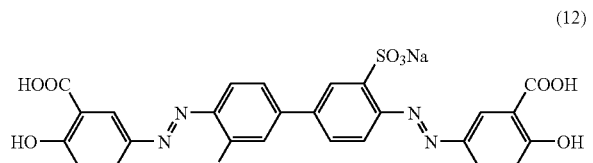

(12)

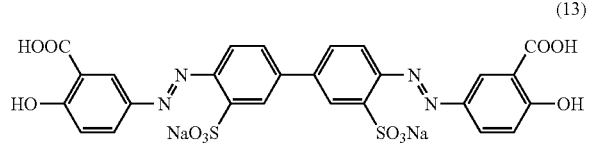

(13)

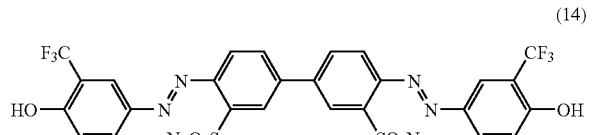

(14)

An example of the polymerizable monomer having as its side chain the azobenzene skeleton may be a compound represented by the following formula (15):

[Chemical Formula 7]

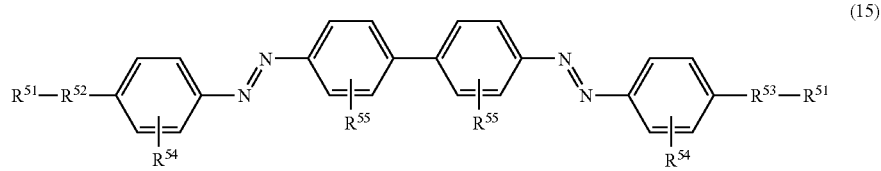

(15)

In the above formula (15), each $R^{51}$ independently represents a (meth)acryloyloxy group, a (meth)acrylamide group, a vinyloxy group, a vinyloxycarbonyl group, a vinyliminocarbonyl group, a vinyliminocarbonyloxy group, a vinyl group, an isopropenyloxy group, an isopropenyloxycarbonyl group, an isopropenyliminocarbonyl group, an isopropenyliminocarbonyloxy group, an isopropenyl group or an epoxy group; $R^{52}$ represents a linking group represented by $-(A^{51}-B^{51}-A^{51})_m-(D^{51})_n-$ and $R^{53}$ represents a linking group represented by $(D^{51})_n-(A^{51}-B^{51}-A^{51})_m-$, in which $A^{51}$ represents a bivalent hydrocarbon group, $B^{51}$ represents —O—, —COO—, —OCO—, —CONH—, —NHCO—, —NHCOO— or —OCONH—, m represents an integer of 0 to 3, $D^{51}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1; each $R^{54}$ independently represents a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt; and each $R^{55}$ independently represents a carboxy group, a sulfo group, a nitro group, an amino group or a hydroxy group provided that the carboxy group or the sulfo group may be combined with an alkali metal to form a salt.

A specific example of the compound represented by the above-mentioned formula (15) is the following compound (16) to (19):

[Chemical Formula 8]

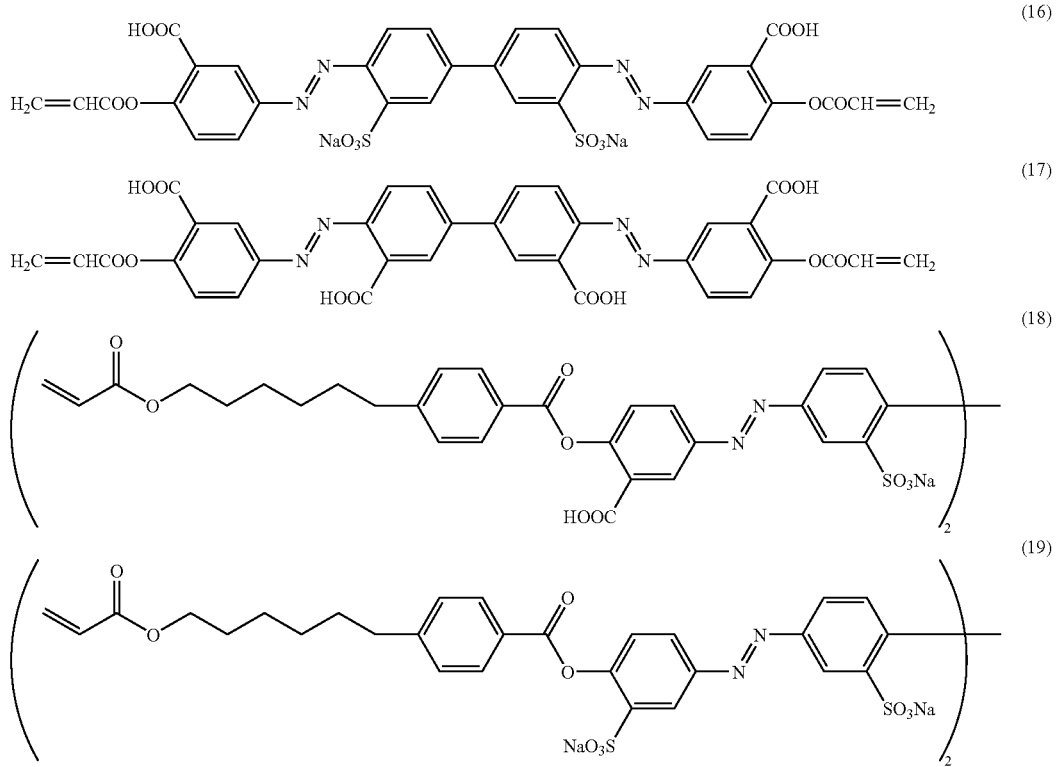

In the present invention, the cis-trans isomerization-reactive skeleton or substituent can be variously selected from the above-mentioned photo-isomerization-reactive compounds in accordance with required properties. One kind of the photo-isomerization-reactive compound may be used alone or a combination of two or more kinds thereof can be used.

Additives, besides the above-mentioned photo-isomerization-reactive compound, may be contained in the photo-isomerization type material as long as the photoaligning of the alignment layer is not hindered. In the case of using a polymerizable monomer as the photo-isomerization-reactive compound, examples of the additives include a polymerization initiator and a polymerization inhibitor.

It is advisable to select the polymerization initiator or the polymerization inhibitor appropriately from generally-known compounds in accordance with the kind of the photo-isomerization-reactive compound and then use the selected one. The added amount of the polymerization initiator or the polymerization inhibitor is preferably from 0.001% to 20% by weight, more preferably from 0.1% to 5% by weight of the photo-isomerization-reactive compound. If the added amount of the polymerization initiator or the polymerization inhibitor is too small, the polymerization may not be initiated (or inhibited). Conversely, if the amount is too large, the reaction may be hindered.

The wavelength range of light which the photo-isomerization type material causes photo-isomerization reaction is preferably within the wavelength range of ultraviolet rays, that is, the range of 10 nm to 400 nm, more preferably within the range of 250 nm to 380 nm.

(Photo Alignment Treatment Method)

Next, the photo alignment treatment method will be explained. First, a first alignment layer forming coating solution prepared by diluting the above-mentioned photo alignment material with an organic solvent is coated onto the first electrode layer to form a first alignment layer-formation layer, and dried.

The content of the photo-dimerization-reactive compound or the photo-isomerization-reactive compound in the first alignment layer forming coating solution is preferably in a range of 0.05% to 10% by weight, and it is more preferably in a range of 0.2% to 2% by weight. In the case the content is fewer than the range, it is difficult to impart appropriate anisotropy to the alignment layer. On the contrary, if the content is more than the range, a homogeneous coating layer can hardly be formed due to the high viscosity of the coating solution.

Examples of the coating method of the first alignment layer forming coating solution are a spin coating, a roll coating, a rod bar coating, a spray coating, an air knife coating, a slot die coating, a wire bar coating, an ink jet coating, a flexo printing, and a screen printing.

The thickness of the first alignment layer-formation layer obtained by coating the first alignment layer forming coating solution is preferably from 1 nm to 1000 nm, more preferably from 3 nm to 100 nm. If the thickness of the first alignment layer-formation layer is thinner than the range, a sufficient photoaligning may not be obtained. Conversely, if the thickness is thicker than the range, resulting costs may not be preferred.

The resultant first alignment layer-formation layer causes photo-excitation reaction by the light irradiation the polarization of which is controlled, whereby anisotropy can be imparted. The wavelength range of the radiated light should be appropriately selected in accordance with the photo alignment material, and is preferably the range of ultraviolet ray wavelengths, that is, the range of 100 nm to 400 nm, more preferably the range of 250 nm to 380 nm. The polarizing direction is not particularly limited as long as it can generate the photo-excitation reaction.

Furthermore, in the case of using, as the photo alignment material, a polymerizable monomer out of the above-mentioned photo-isomerization type reactive compounds, the anisotropy imparted to the alignment layer can be stabilized by subjecting the monomer to photo alignment treatment, and then polymerizing the monomer by heating the monomer.

b. Rubbing Treatment

When the first alignment layer-formation layer is processed by rubbing treatment to form the first alignment layer, a material which will be explained later is coated to the surface of the first electrode layer to form a first alignment layer-formation layer and this first alignment layer-formation layer is rubbed in a fixed direction with a rubbing cloth to impart anisotropy to the first alignment layer-formation layer, whereby the first alignment layer can be formed.

Any material may be used as the material for the rubbed layer without any particular limitation insofar as it can impart anisotropy to the first alignment layer-formation layer by rubbing treatment. Examples of the material may include polyimide, polyamide, polyamideimide, polyether imide, polyvinyl alcohol and polyurethane. These compounds may be used either singly or in combinations of two or more.

Among these compounds, polyimide is preferable and polyimide obtained from polyamic acid by cyclodehydration (imidization) is particularly preferable.

The polyamic acid may be synthesized by reacting a diamine compound with an acid dianhydride.

As the diamine compound to be used in the synthesis of the polyamic acid, alicyclic diamine, carbocyclic aromatic diamines, heterocyclic diamines, aliphatic diamine and aromatic diamine are exemplified.

Examples of the alicyclic diamine include 1,4-diaminocyclohexane, 1,3-diaminocyclohexane, 4,4'-diaminodicyclohexylmethane, 4,4'-diamino-3,3'-dimethyldicyclohexane and isophorone diamine.

Examples of the carbocyclic aromatic diamines include o-phenylenediamine, m-phenylenediamine, p-phenylenediamine, diaminotoluenes (specifically, 2,4-diaminotoluene), 1,4-diamino-2-methoxybenzene, diaminoxylenes (specifically, 1,3-diamino-2,4-dimethylbenzene), 1,3-diamino-4-chlorobenzene, 1,4-diamino-2,5-dichlorobenzene, 1,4-diamino-4-isopropylbenzene, 2,2'-bis(4-aminophenyl)propane, 4,4'-diaminodiphenylmethane, 2,2'-diaminostilbene, 4,4'-diaminostilbene, 4,4'-diaminodiphenyl ether, 4,4'-diphenyl thioether, 4,4'-diaminodiphenylsulfone, 3,3'-diaminodiphenylsulfone, phenyl 4,4'-diaminobenzoate, 4,4'-diaminobenzophenone, 4,4'-diaminobenzyl, bis(4-aminophenyl)phosphine oxide, bis(3-aminophenyl)sulfone, bis(4-aminophenyl)phenylphosphine oxide, bis(4-aminophenyl)cyclohexylphosphine oxide, N,N-bis(4-aminophenyl)-N-phenylamine, N,N-bis(4-aminephenyl)-N-methylamine, 4,4'-diaminodiphenylurea, 1,8-diaminonaphthalene, 1,5-diaminonaphthalene, 1,5-diaminoanthraquinone, diaminofluorenes (specifically, 2,6-diaminofluorene), bis(4-aminophenyl)diethylsilane, bis(4-aminophenyl)dimethylsilane, 3,4'-diaminodiphenyl ether, benzidine, 2,2'-dimethylbenzidine, 2,2-bis[4-(4-aminophenoxy)phenyl]propane, bis[4-(4-aminophenoxy)phenyl]sulfone, 4,4'-bis(4-aminophenoxy)biphenyl, 2,2-bis[4-(4-aminophenoxy)phenyl]hexafluoropropane, 1,4-bis(4-aminophenoxy)benzene and 1,3-bis(4-aminophenoxy)benzene.

Examples of the heterocyclic diamines include 2,6-diaminopyridine, 2,4-diaminopyridine, 2,4-diamino-s-triazine, 2,5-diaminodibenzofuran, 2,7-diaminocarbazole, 3,6-diaminocarbazole, 3,7-diaminophenothiazine, 2,5-diamino-1,3,4-thiadiazole and 2,4-diamino-6-phenyl-s-triazine.

Examples of the aliphatic diamine include 1,2-diaminoethane, 1,3-diaminopropane, 1,4-diaminobutane, 1,5-diaminopentane, 1,6-diaminohexane, 1,8-diaminooctane, 1,10-diaminodecane, 1,3-diamino-2,2-dimethylpropane, 1,6-diamino-2,5-dimethylhexane, 1,5-diamino-2,4-dimethylheptane, 1,7-diamino-3-methylheptane, 1,9-diamino-5-methylnonane, 2,11-diaminododecane, 1,12-diaminooctadecane and 1,2-bis(3-aminopropoxy)ethane.

Examples of the aromatic diamine include those having a long-chain alkyl or perfluoro group represented by the following chemical formula.

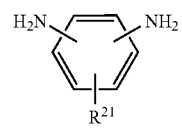

[Chemical Formula 9]

Here, $R^{21}$ in the above formula represents a long-chain alkyl group having 5 or more carbon atoms, preferably 5 to 20 carbon atoms or a monovalent organic group containing a long-chain alkyl group or a perfluoroalkyl group.

As the acid dianhydride used as the raw material in the synthesis of the polyamic acid, aromatic acid dianhydride and alicyclic acid dianhydride are exemplified.

Examples of the aromatic acid dianhydride include pyromellitic acid dianhydride, 3,3',4,4'-biphenyltetracarboxylic acid dianhydride, 2,2',3,3'-biphenyltetracarboxylic acid dianhydride, 2,3,3',4'-biphenyltetracarboxilic acid dianhydride, 3,3',4,4'-benzophenone tetracarboxylic acid dianhydride, 2,3,3',4'-benzophenone tetracarboxylic acid dianhydride, bis(3,4-dicarboxyphenyl)ether dianhydride, bis(3,4-dicarboxyphenyl) sulfone dianhydride, 1,2,5,6-naphthalene tetracarboxylic acid dianhydride and 2,3,6,7-naphthalene tetracarboxylic acid dianhydride.

Examples of the alicyclic acid dianhydride include 1,2,3,4-cyclobutanetetracarboxylic acid dianhydride, 1,2,3,4-cyclopentanetetracarboxylic acid dianhydride, 2,3,4,5-tetrahydrofuran tetracarboxylic acid dianhydride, 1,2,4,5-cyclohexanetetracarboxylic acid dianhydride, 3,4-dicarboxy-1-cyclohexylsuccinic acid dianhydride, 3,4-dicarboxy-1,2,3,4-tetrahydro-1-naphthalenesuccinic acid dianhydride and bicyclo[3,3,0]octane-2,4,6,8-tetracarboxylic acid dianhydride.

These acid dianhydrides may be used either singly or in combinations of two or more. It is preferable to use an alicyclic acid dianhydride from the viewpoint of the transparency of the polymer.

Also the polyamic acid may be synthesized by reacting the foregoing diamine compound with an acid dianhydride in the presence of an organic solvent at −20° C. to 150° C. and preferably 0° C. to 80° C. for 30 minutes to 24 hours and preferably 1 hour to 10 hours.

Examples of the method used to obtain the polyimide film by using the polyamic acid include: a method in which after a film of the polyamic acid is formed, a part or all of the polyamic acid is cyclodehydrated (imidization) either by heating or using a catalyst, and a method in which the polyamic acid is partly or wholly cyclodehydrated (imidization) into a soluble polyimide either by heating or using a catalyst, which is then made into a film. Among these methods, it is preferable to use the soluble polyimide because the soluble polyimide obtained by converting the polyamic acid into an imide has excellent storage stability.

Examples of the method used to undergo the imidization reaction to convert the polyamic acid into a soluble polyimide include a thermal imidization method in which a polyamic acid solution is heated as it is and a chemical imidization method in which a catalyst is added in a polyamic acid solution to form an imide. Among these methods, the chemical imidization method in which an imidization reaction is run at a relatively lower temperature is preferable because this method is resistant to a reduction in the molecular weight of the obtained soluble polyimide.

It is preferable to run the chemical imidization reaction using the polyamic acid in an organic solvent in the presence of a base catalyst in an amount of 0.5 to 30 mol equivalents and preferably 1 to 20 mol equivalents to the amount of the amic acid group and the acid anhydride in an amount of 0.5 to 50 mol equivalents and preferably 1 to 30 mol equivalents to the amount of the amic acid group at −20° C. to 250° C. and preferably 0° C. to 200° C. for 1 hour to 100 hours. This is because if the amount of the base catalyst or the acid anhydride is smaller, the progress of the reaction is insufficient whereas if the amounts are excessive, it is difficult to remove these materials completely after the reaction is finished.

As the base catalyst to be used in the chemical imidization reaction, pyridine, triethylamine, trimethylamine, tributylamine and trioctylamine may be exemplified. Among these compounds, pyridine is preferable because it has basicity moderate to progress the reaction.

As the acid anhydride, acetic acid anhydride, trimellitic acid anhydride and pyromellitic acid anhydride may be exemplified. Among these compounds, it is preferable to use acetic acid anhydride because the use of acetic acid anhydride makes easy to refine the reaction product obtained after the reaction.

As the organic solvent used in the imidization reaction, the same solvent that is used in the synthesis of the polyamic acid may be used.

The imidization ratio of the chemical imidization may be controlled by regulating the amount of the catalyst and reaction temperature. Particularly, the above imidization ratio is preferably 0.1% to 99%, more preferably 5% to 90% and still more preferably 30% to 70% of the molar number of total polyamic acids. This is because if the imidization ratio is too low, it causes deterioration in storage stability, whereas if the imidization ratio is too high, there is the case where the solubility is deteriorated, causing precipitation.

As the material for the rubbed layer, "SE-5291" and "SE-7992" manufactured by Nissan Chemical Industries, Ltd. are preferably used.

As the method of coating the above material, a roll coating method, a rod bar coating method, a slot die coating method, a wire bar coating method, an ink jet method, a flexo-printing method, a screen printing method or the like may be used.

The thickness of the rubbed layer is designed to be about 1 nm to 1000 nm and preferably in a range from 50 nm to 100 nm.

As the rubbing cloth, for example, those made of a fiber of a nylon resin, vinyl resin, rayon or cotton may be used. For example, a drum around which such a rubbing cloth is wound is brought into contact with the surface of the film using the above material while rotating the drum to thereby form fine channels in one direction on the surface of the film, with the result that anisotropy is imparted to the first alignment layer-formation layer.

(ii) Second Embodiment

The first alignment layer formation step in this embodiment is a step in which a first alignment layer-formation layer is formed on a first substrate on which a first electrode layer is formed and the first alignment layer-formation layer is subjected to alignment treatment to form a first alignment layer. First, a layer to form an alignment layer for reactive liquid crystal is formed and this layer to form an alignment layer for reactive liquid crystal is subjected to alignment treatment to form an alignment layer for reactive liquid crystal. Then, a fixed liquid crystal layer (reacted liquid crystal layer) is obtained by fixing a reactive liquid crystal on the alignment layer for reactive liquid crystal. In other words, as the first alignment layer, the alignment layer for reactive liquid crystal and the fixed liquid crystal layer are laminated. In this embodiment, the alignment treatment provided to the layer to form an alignment layer for reactive liquid crystal corresponds to "the alignment in the first alignment layer formation step" so-described in the present invention.

When the fixed liquid crystal layer is formed on the alignment layer for reactive liquid crystal, the reactive liquid crystal is aligned by the alignment layer for reactive liquid crystal and irradiated with, for example, ultraviolet rays to polymerize the reactive liquid crystal, whereby the alignment state of the reactive liquid crystal can be fixed. Accordingly, the alignment control ability of the alignment layer for reactive liquid crystal can be imparted to the fixed liquid crystal layer and therefore, the fixed liquid crystal layer can be made to act as an alignment layer used to align the ferroelectric liquid crystal. Since the reactive liquid crystal is fixed, there is such an advantage that it is not affected by temperature or the like. Moreover, the reactive liquid crystal has a structure relatively similar to that of the ferroelectric liquid crystal, there is a strong interaction between the reactive liquid crystal and the ferroelectric liquid crystal and therefore, the alignment of the ferroelectric liquid crystal can be controlled more efficiently than in the case of using only an alignment layer that is a single layer.

Here, the term "reactive liquid crystal" means a liquid crystal before the alignment state of the liquid crystal is fixed. For example, when the liquid crystal is to be polymerized, it means a polymerizable liquid crystal before the alignment state of the liquid crystal is fixed.

The term "fixed liquid crystal layer" means the layer made of the fixed liquid crystal obtained after the alignment state of the liquid crystal is fixed. For example, when the liquid crystal is to be polymerized, it means the layer made of the polymerized liquid crystal.

The alignment layer for reactive liquid crystal of the present embodiment is the same as the first alignment layer described in the first embodiment, and thus explanation thereof is omitted herein.

As reactive liquid crystal used in the invention, it is preferable that the reactive liquid crystal expresses a nematic phase. This is because the nematic phase can allow the alignment control relatively easily among the liquid crystal phases.

It is further preferable that the reactive liquid crystal has a polymerizable liquid crystal material. Accordingly, the aligned state of the reactive liquid crystal can be fixed. As the polymerizable liquid crystal material, any of a polymerizable liquid crystal monomer, a polymerizable liquid crystal oligomer and a polymerizable liquid crystal polymer can be used. In the present invention, the polymerizable liquid crystal monomer can be used preferably. Compared with the other polymerizable liquid crystal materials, that is, a polymerizable liquid crystal oligomer and a polymerizable liquid crystal polymer, the polymerizable liquid crystal monomer can be aligned at a lower temperature and it has a high alignment sensitivity so that it can be aligned easily.

The above-mentioned polymerizable liquid crystal monomer is not particularly limited as long as it is a liquid crystal monomer having a polymerizable functional group. For example, a monoacrylate monomer, a diacrylate monomer, or the like can be presented. Moreover, these polymerizable liquid crystal monomers may be used alone or as a mixture of two or more kinds.

As the monoacrylate monomer, for example, the compounds represented by the below-mentioned formulae (20) and (21) can be presented:

[Chemical Formula 12]

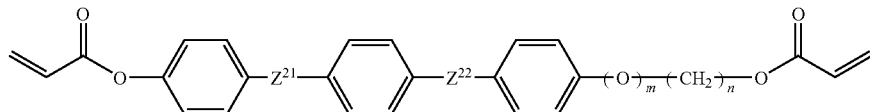
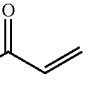
(23)

[Chemical Formula 10]

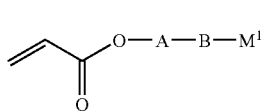
(20)

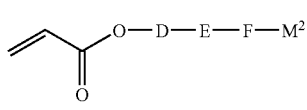
(21)

In the above-mentioned formulae (20) and (21), A, B, D, E and F are benzene, cyclohexane or pyrimidine, which may have a substituent group such as halogen. Moreover, A and B, or D and E may be bonded via a bonding group such as an acetylene group, a methylene group and an ester group. $M^1$ and $M^2$ may be any of a hydrogen atom, an alkyl group having 3 to 9 carbon atoms, an alkoxy carbonyl group having 3 to 9 carbon atoms, or a cyano group. Furthermore, an acryloyloxy group on the molecular chain end and A or D may be bonded via a spacer such as an alkylene group having 3 to 6 carbon atoms.

Furthermore, as the diacrylate monomer, for example, the compounds represented by the below-mentioned formula (22) can also be presented:

[Chemical Formula 11]

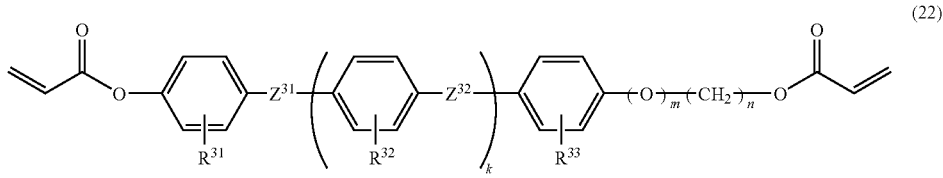
(22)

In the formula (22), $Z^{31}$ and $Z^{32}$ are each independently and directly bonded —COO—, —OCO—, —O—, —$CH_2CH_2$—, —CH=CH—, —$OCH_2$—, —$CH_2O$—, —$CH_2CH_2COO$— or —$OCOCH_2CH_2$—; $R^{31}$, $R^{32}$ and $R^{33}$ are each independently a hydrogen or an alkyl having 1 to 5 carbon atoms; k and m is each 0 or 1; and n is an integer in a range of 2 to 8. When K=1, $R^{31}$, $R^{32}$ and $R^{33}$ are each independently alkyl having 1 to 5 carbon atoms. When K=0, they are each independently hydrogen or alkyl having 1 to 5 carbon atoms. Further, $R^{31}$, $R^{32}$ and $R^{33}$ may be the same to each other.

As a specific example of the formula (22), a compound represented by the below formula (23) can be cited.

In the above-mentioned formula (23), $Z^{21}$ and $Z^{22}$ are each independently and directly bonded —COO—, —OCO—, —O—, —CH$_2$CH$_2$—, —CH═CH—, —OCH$_2$—, —CH$_2$O—, —CH$_2$CH$_2$COO— or —OCOCH$_2$CH$_2$—; m is 0 or 1; and n is an integer in a range of 2 to 8.

Moreover, as the diacrylate monomer, for example, the compounds represented by the below-mentioned formulae (24) and (25) can be presented:

[Chemical Formula 13]

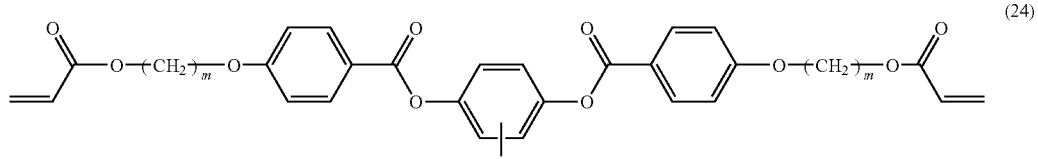

(24)

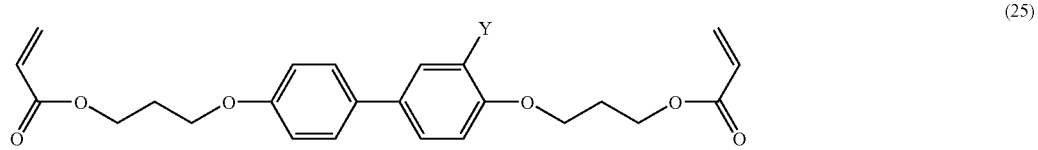

(25)

In the formulae (24) and (25), X and Y each is hydrogen, alkyl having 1 to 20 carbon atoms, alkenyl having 1 to 20 carbon atoms, alkyloxy having 1 to 20 carbon atoms, alkyloxy carbonyl having 1 to 20 carbon atoms, formyl, alkyl carbonyl having 1 to 20 carbon atoms, alkyl carbonyloxy having 1 to 20 carbon atoms, halogen, cyano or nitro; and m is an integer in a range of 2 to 20. Moreover, X is preferably alkyloxy carbonyl having 1 to 20 carbon atoms, methyl or chlorine. Among them, it is preferably alkyloxy carbonyl having 1 to 20 carbon atoms, and particularly preferably CH$_3$ (CH$_2$)$_4$OCO.

The compounds represented by the formulae (22) and (24) are preferably used, and the compound represented by the formula (24) is particularly suitable. As the specific examples, ADEKA CHIRACOL PLC-7183, ADEKA CHIRACOL PCL-7209 and ADEKA CHIRACOL PCL-7218 manufactured by ASAHI DENKA Co., Ltd., or the like can be presented.

The polymerizable liquid crystal monomer is preferably a diacrylate monomer among the above-mentioned examples. This is because the diacrylate monomer can carry out polymerization easily while preferably maintaining the aligned state.

The above-mentioned polymerizable liquid crystal monomer may not express the nematic phase by itself. These polymerizable liquid crystal monomers may be used as a mixture of two or more kinds as mentioned above so that a composition mixture thereof, that is, a reactive liquid crystal may express the nematic phase.

Furthermore, as needed, a photo polymerization initiating agent or a polymerization inhibiting agent may be added to the above-mentioned reactive liquid crystal. For example, at the time of polymerizing a polymerizable liquid crystal material by the electron beam irradiation, the photo polymerization initiating agent may not be needed, however, in the case of the polymerization used commonly by for example, the ultraviolet ray irradiation, a photo polymerization initiating agent is generally used for promoting the polymerization.

As the photo polymerization initiating agent to be used in the present invention, benzyl (it is also referred to as bibenzoyl), benzoin isobutyl ether, benzoin isopropyl ether, benzophenone, benzoyl benzoic acid, methyl benzoyl benzoate, 4-benzoyl-4'-methyl diphenyl sulfide, benzyl methyl ketal, dimethyl amino methyl benzoate, 2-n-butoxy ethyl-4-dimethyl amino benzoate, p-dimethyl amino isoamyl benzoate, 3,3'-dimethyl-4-methoxybenzophenone, methylobenzoyl formate, 2-methyl-1-(4-(methyl thio)phenyl)-2-morpholino propane-1-on, 2-benzyl-2-dimethyl amino-1-(4-morpholino phenyl)-butane-1-on, 1-(4-dodecyl phenyl)-2-hydroxy-2-methyl propane-1-on, 1-hydroxy cyclohexyl phenyl ketone, 2-hydroxy-2-methyl-1-phenyl propane-1-on, 1-(4-isopropyl phenyl)-2-hydroxy-2-methyl propane-1-on, 2-chloro thioxantone, 2,4-diethyl thioxantone, 2,4-diisopropyl thioxantone, 2,4-dimethyl thioxantone, isopropyl thioxantone, 1-chloro-4-propoxy thioxantone, or the like can be presented. In addition to the photo polymerization initiating agent, a sensitizing agent may be added within a range of not deteriorating the object of the present invention.

The addition amount of such a photo polymerization initiating agent is in general 0.01% to 20% by weight, it is preferably 0.1% to 10% by weight, and more preferably in a range of 0.5% to 5% by weight so as to be added to the above-mentioned reactive liquid crystal.

In the present invention, the fixed liquid crystal layer can be formed by coating a fixed liquid crystal layer coating solution including the above-mentioned reactive liquid crystal onto the alignment layer for reactive liquid crystal and applying the alignment treatment so as to fix the aligned state of the reactive liquid crystal. Moreover, a method of preliminarily forming a dry film, or the like and laminating the same onto the alignment layer for reactive liquid crystal can also be used to form a fixed liquid crystal layer. It is preferable to apply the fixed liquid crystal layer forming coating solution because it allows a simple process.

The fixed liquid crystal layer forming coating solution can be prepared by dissolving or dispersing the reactive liquid crystal into a solvent.

The solvent used for the fixed liquid crystal layer forming coating solution is not particularly limited as long as it can dissolve or disperse the reactive liquid crystal, or the like without inhibiting the alignment ability of the alignment layer for reactive liquid crystal. As examples of such solvent, hydrocarbons such as benzene, toluene, xylene, n-butyl benzene, diethyl benzene and tetralin; ethers such as methoxy benzene, 1,2-dimethoxy benzene and diethylene glycol dimethyl ether; ketones such as acetone, methyl ethyl ketone, methyl isobutyl ketone, cyclohexanone and 2,4-pentane dion; esters such as ethyl acetate, propylene glycol monomethyl ether acetate, propylene glycol monoethyl ether acetate and γ-butyrolactone; amide based solvents such as 2-pyrolidone, N-methyl-2-pyrolidone, dimethyl formamide and dimethyl acetamide; alcohols such as t-butyl alcohol, diacetone alcohol, glycerol, monoacetin, ethylene glycol, triethylene glycol and hexylene glycol; phenols such as phenol and parachloro phenol; cellosolves such as methyl cellosolve, ethyl cellosolve, butyl cellosolve and ethylene glycol monomethyl ether acetate can be used. These solvents may be used alone or in a mixture of two or more.

Moreover, by using only one kind of a solvent, the solubility of the above-mentioned reactive liquid crystal, or the like may be insufficient or the alignment layer for reactive liquid crystal be corroded as mentioned above. By using two or more kinds of the solvents as a mixture, the trouble can be avoided. Among the above-mentioned solvents, those preferable as a single solvent are the hydrocarbons and the glycol monoether acetate based solvents, and those preferable as a solvent mixture are a mixture of the ethers or the ketones and the glycol based solvents.

Since the concentration of the fixed liquid crystal layer forming coating solution depends on the solubility of the reactive liquid crystal and the thickness of the fixed liquid crystal layer to be formed, it cannot be defined on the whole, however, it is prepared in general in a range of 0.1% to 40% by weight, and preferably in a range of 1% to 20% by weight. In the case the concentration of the fixed liquid crystal layer forming coating solution is lower than the above-mentioned range, the reactive liquid crystal may hardly be aligned. On the other hand, in the case the concentration is higher than the above-mentioned range, the viscosity of the fixed liquid crystal layer forming coating solution becomes higher so that an even coating film may hardly be formed.

Furthermore, to the fixed liquid crystal layer forming coating solution, the compounds as mentioned below can be added within a range of not deteriorating the purpose of the present invention. As the compounds to be added, for example, polyester (meth)acrylates obtained by reacting a polyester prepolymer obtained by the condensation of a polyhydric alcohol and a monobasic acid or a polybasic acid with (meth) acrylic acid; polyurethane (meth)acrylates obtained by reacting a polyol group and a compound having two isocyanate groups with each other, and reacting the reaction product with (meth)acrylic acid; photo polymerizable compounds such as epoxy(meth)acrylate, obtained by reacting epoxy resins such as a bisphenol A type epoxy resin, a bisphenol F type epoxy resin, a novolak type epoxy resin, polycarboxylic acid polyglycidyl ester, polyol polyglycidyl ether, an aliphatic or alicyclic epoxy resin, an amine epoxy resin, a triphenol methane type epoxy resin and a dihydroxy benzene type epoxy resin with (meth) acrylic acid; photo polymerizable liquid crystal compounds having an acrylic group or a methacrylic group, or the like can be presented.

The addition amount of these compounds to the above-mentioned reactive liquid crystal can be selected within a range of not deteriorating the purpose of the present invention. By adding these compounds, the hardening properties of the reactive liquid crystal can be improved so that the mechanical strength of the fixed liquid crystal layer to be obtained can be increased and furthermore, the stability thereof can be improved.

AS a method for coating such fixed liquid crystal layer forming coating solution, a spin coating method, a roll coating method, a printing method, a dip coating method, a die coating method, a casting method, a bar coating method, a blade coating method, a spray coating method, a gravure coating method, a reverse coating method, an extruding coating method, an ink jet printing, a flexo printing or a screen printing can be presented.

Moreover, after coating the fixed liquid crystal layer forming coating solution, the solvent is removed, and the solvent removal can be carried out by the reduced pressure removal or the heating removal; furthermore, a method as a combination thereof, or the like.

After the coating of the fixed liquid crystal layer forming coating solution, the coated reactive liquid crystal is aligned by the alignment layer for reactive liquid crystal so as to be in a state having the liquid crystal regularity. That is, the reactive liquid crystal comes to have the nematic phase. This is carried out in general by a method such as the heat treatment to the N-I transition point or lower which is the temperature of the transition from the liquid crystal phase to the isotropic phase.

As mentioned above, the reactive liquid crystal has a polymerizable liquid crystal material. In order to fix the aligned state of such a polymerizable liquid crystal material, a method of irradiating an activating radiation for activating the polymerization is used. The "activating radiation" here is the radiation having the ability of inducing the polymerization to the polymerizable liquid crystal material. As needed, a photo polymerization initiating agent may be included in the polymerizable liquid crystal material.

The activating radiation is not particularly limited as long as it is a radiation capable of polymerizing the polymerizable liquid crystal material. In general, from the viewpoint of the device easiness, or the like, an ultraviolet ray or a visible light beam is used. An irradiation beam having a wavelength of 150 nm to 500 nm, preferably 250 nm to 450 nm, further preferably 300 nm to 400 nm is used.

Among them, a method of irradiating an ultraviolet ray as the activating radiation to a polymerizable liquid crystal material to have the radical polymerization by generating a radical by the photo polymerization initiating agent with an ultraviolet ray is a preferable method. Since the method of using an ultraviolet ray as the activating radiation is a technique already established, it can be applied easily to the present invention including the photo polymerization initiating agent to be used.

As the light source of the irradiating light beam, a low pressure mercury lamp (a germicidal lamp, a fluorescent chemical lamp, a black light), a high pressure discharge lamp (a high pressure mercury lamp, a metal halide lamp), a short arc discharge lamp (an ultra high pressure mercury lamp, a xenon lamp, a mercury xenon lamp), or the like can be presented as the examples. In particular, use of a metal halide lamp, a xenon lamp, a high pressure mercury lamp, or the like can be recommended. Moreover, the irradiation strength is adjusted optionally according to the composition of the reactive liquid crystal and the amount of the photo polymerization initiating agent.

The irradiation of such an activating radiation can be carried out by the temperature condition to have the above-mentioned polymerizable liquid crystal material in a liquid crystal phase, or at a temperature lower than the temperature to have the liquid crystal phase. The polymerizable liquid crystal material once had the liquid crystal phase would not have the sudden disturbance in the aligned state even in the case the temperature is lowered thereafter.

As a method for fixing the aligned state of the polymerizable liquid crystal material, in addition to the above-mentioned method of directing the activating radiation, a method of polymerizing the polymerizable liquid crystal material by heating can be used as well. As the reactive liquid crystal used in this case, those having the polymerizable liquid crystal monomers contained in the reactive liquid crystal are thermally polymerized at the N-I transition point or lower of the reactive liquid crystal are preferable.

The fixed liquid crystal layer obtained in the above manner functions as an alignment layer that aligns the ferroelectric liquid crystal as mentioned above and has alignment control ability.

Since the fixed liquid crystal layer aligns the reactive liquid crystal by the presence of the alignment layer for reactive liquid crystal and the reactive liquid crystal is irradiated with, for example, ultraviolet rays to polymerize the reactive liquid crystal, and by fixing the alignment state of the reactive liquid crystal, it has a phase difference.

The thickness of the fixed liquid crystal layer is properly regulated in accordance with the target anisotropy and may be set in a range from 1 nm to 1000 nm and preferably in a range from 3 nm to 100 nm. When the thickness of the fixed liquid crystal layer is too large, anisotropy more than necessary is generated whereas when the thickness is too small, there is the case where no desired anisotropy is obtained.

(iii) First Substrate

Any material may be used as the first substrate used in the present invention without any particular limitation insofar as it is usually used as the substrate of liquid crystal displays. Preferable examples of the first substrate include glass plates and plastic plates.

(iv) First Electrode Layer

Any material may be used as the first electrode layer used in the present invention without any particular limitation insofar as it is usually used as the electrode of liquid crystal displays. However, one of the first electrode layer formed on the liquid crystal side substrate and the second electrode layer of the counter substrate is preferably formed of a transparent conductive body. Preferable examples of the transparent conductive material include indium oxide, tin oxide and indium tin oxide (ITO).

When the liquid crystal display obtained in the present invention is driven by an active matrix system using TFT, a whole surface common electrode formed of the transparent conductive material is provided on one of the liquid crystal side substrate and the counter substrate, and gate electrodes and source electrodes are arranged in matrix form on the other to provide a TFT element and a pixel electrode in a part surrounded by the gate electrode and the pixel electrode.

Examples of the method of forming the first electrode layer include chemical vapor deposition (CVD) methods and physical vapor deposition (PVD) methods such as a sputtering method, an ion plating method and a vacuum deposition method.

(2) Columnar Spacer Formation Step

In the step of preparing the liquid crystal side substrate in the present invention, a columnar spacer formation step may be carried out to form a columnar spacer on the first substrate prior to the first alignment layer formation step. As will be described later, the columnar spacer formation step used to form a columnar spacer on the first substrate is not carried out when the columnar spacer formation step is used to form a columnar spacer on the second substrate in the counter substrate preparation step. In other words, the columnar spacer may be formed either on the liquid crystal side substrate or on the counter substrate.

As the material of the columnar spacer, a material usually used for the columnar spacer in liquid crystal displays may be used. Specific examples of the material of the columnar spacer may include resins, among which photosensitive resins are preferably used. This is because the photosensitive resins are easily patterned.

As the method of forming the columnar spacer, any usual patterning method may be used without any particular limitation insofar as it can form the columnar spacer at a desired position. Examples of the method include a photolithographic method, an ink jet method and a screen printing method.

The columnar spacer is usually formed in plural and it is preferable that plural columnar spacers be formed regularly at desired positions and it is more preferable that plural columnar spacers be formed at equal intervals. This is because if plural columnar spacers are formed at random positions, there is the case where it is difficult to exactly control the amount of a ferroelectric liquid crystal to be applied.

The pitch of the columnar spacers is designed to be about 100 μm to 3 mm, preferably in a range from 200 μm to 1.5 mm and more preferably in a range from 300 μm to 1.0 mm. This is because if the pitch of the columnar spacers is less than the above range, there is the possibility that display qualities are deteriorated by the alignment defect of the ferroelectric liquid crystal in the vicinities of columnar spacers, whereas if the pitch of the columnar spacers exceeds the above range, there is the case where no desired impact resistance is obtained and it is difficult to keep a constant cell gap, though depending on the size of the liquid crystal display. Here, the pitch of the columnar spacers means the distance between the centers of adjacent columnar spacers.

As to the size of the columnar spacer, the diameter of the bottom of the columnar spacer is designed to be about 1 μm to 100 μm, preferably in a range from 2 μm to 50 μm and more preferably in a range from 5 μm to 20 μm in the case where the columnar spacer has a cylindrical form for example. This is because when the size of the columnar spacer exceeds the above range, the columnar spacers are also formed in the pixel area resultantly, leading to a decrease in effective pixel area and there is the case where no good image display is obtained, whereas when the size of the columnar spacer is less than the above range, there is the case where it is difficult to form the columnar spacer.

Moreover, the height of the columnar spacer is designed to be about the same as the size of a cell gap.

The pitch, size and height of the columnar spacers may be measured using a scanning electron microscope (SEM) to observe the sections of the partition walls.

Examples of the shape of the columnar spacer may include a cylindrical form, a prism form and a truncated conical form.

Although no particular limitation is imposed on the position of the columnar spacer, the columnar spacer is preferably formed in a non-pixel area. This is because it is desirable that the columnar spacer be formed in a non-pixel area having no influence on image display since an alignment defect of a ferroelectric liquid crystal is easily caused in the vicinity of the columnar spacer. When the liquid crystal side substrate is, for example, a TFT substrate, the columnar spacers may be provided on gate electrodes and source electrodes formed in matrix form.

No particular limitation is imposed on the number of columnar spacers as long as the number of columnar spacers is two or more and the number is properly selected according to the size of the liquid crystal display.

There is no limitation to the order of the columnar spacer formation step insofar as it is carried out prior to the first alignment layer formation step, and the columnar spacer may be formed either on the first substrate or on the first electrode layer. In other words, the columnar spacer and the first electrode layer may be formed in this order or the first electrode layer and the columnar spacer may be formed in this order on the first substrate.

(3) Linear Partition Wall Formation Step

In the liquid crystal side substrate preparation step in the present invention, a linear partition wall formation step used to form a linear partition wall on the first substrate is preferably carried out prior to the first alignment layer formation step. This is because the formation of the linear partition wall can improve the impact resistance. Because the SmC* phase has very low resistance to external impact, the high impact resistance is useful in the liquid crystal display using the ferroelectric liquid crystal.

When the linear partition wall formation step is carried out in the liquid crystal side substrate preparation step, the first alignment layer-formation layer is aligned in a direction substantially perpendicular or substantially parallel to the longitudinal direction of the linear partition wall in the first alignment layer formation step and the ferroelectric liquid crystal is linearly coated in a direction substantially parallel to the longitudinal direction of the linear partition wall in a liquid crystal coating step which will be explained later. When the longitudinal direction of the linear partition wall and the direction of the alignment treatment and the coating direction of the ferroelectric liquid crystal in the first alignment layer formation step are designed to satisfy the requirements of the above relation, the ferroelectric liquid crystal can be coated linearly in a direction substantially parallel or substantially perpendicular to the direction of the alignment treatment conducted in the first alignment layer formation step, whereby the ability to align the ferroelectric liquid crystal can be improved and the generation of alignment defects can be suppressed.

Figure 8A:
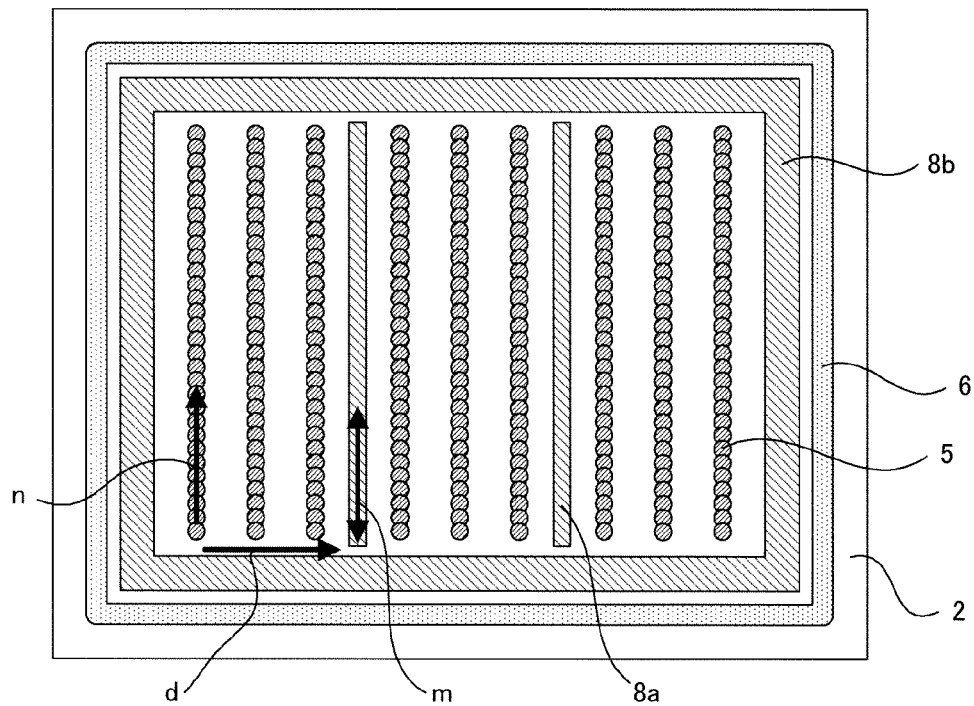
FIGS. 8A and 8B are each a view showing the direction of alignment treatment and the coating direction of a ferroelectric liquid crystal in a first alignment layer formation step.

In the case where, as shown in, for example, FIG. 8A, the angle formed between the longitudinal direction m of the linear partition wall 8a and the direction d of the alignment treatment conducted in the first alignment layer formation step is substantially perpendicular, the ferroelectric liquid crystal 5 is coated linearly in a direction substantially parallel to the longitudinal direction m of the linear partition wall 8a to thereby coat the ferroelectric liquid crystal 5 linearly in a direction substantially perpendicular to the direction d of the alignment treatment conducted in the first alignment layer formation step. That is, the angle formed between the coating direction n of the ferroelectric liquid crystal and the direction d of the alignment treatment conducted in the first alignment layer formation step may be made to be substantially perpendicular.

Figure 8B:
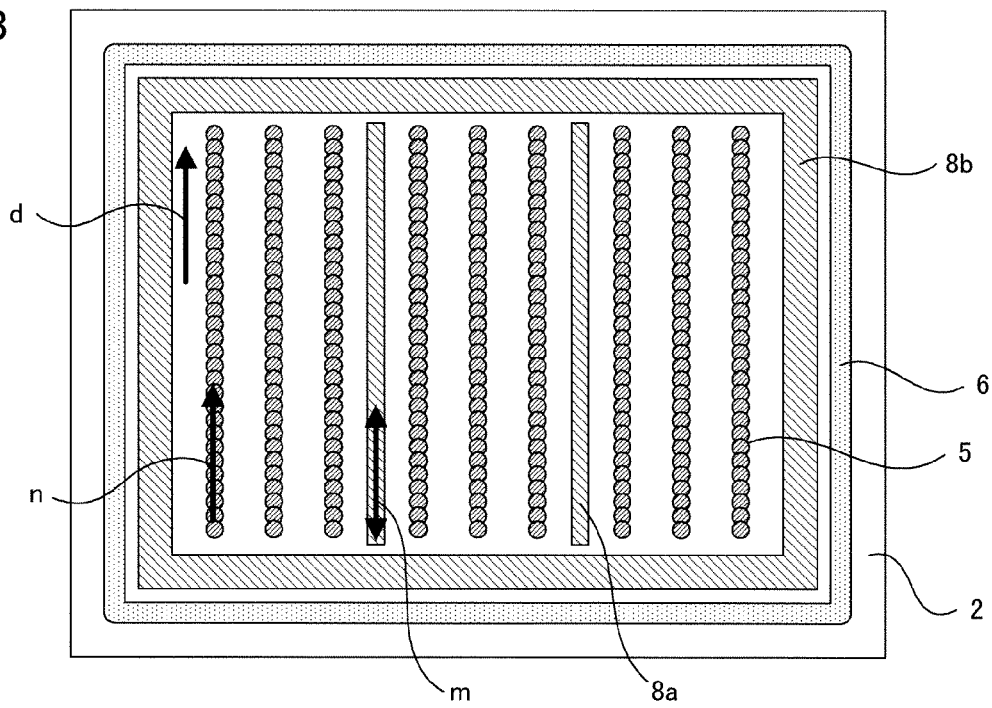

As shown in, for example, in FIG. 8B, the angle formed between the longitudinal direction m of the linear partition wall 8a and the direction d of the alignment treatment conducted in the first alignment layer formation step is substantially parallel, the ferroelectric liquid crystal 5 is coated linearly in a direction substantially parallel to the longitudinal direction m of the linear partition wall 8a to thereby coat the ferroelectric liquid crystal 5 linearly in a direction substantially parallel to the direction d of the alignment treatment conducted in the first alignment layer formation step. That is, the angle formed between the coating direction n of the ferroelectric liquid crystal and the direction d of the alignment treatment conducted in the first alignment layer formation step may be made to be substantially parallel.

The description reading: "aligned in a direction substantially perpendicular or substantially parallel to the longitudinal direction of the linear partition wall" means that the angle formed between the longitudinal direction of the linear partition wall and the direction of the alignment treatment conducted in the first alignment layer formation step is $90°\pm5°$ and preferably $90°\pm2°$. The description reading: "the angle formed between the longitudinal direction of the linear partition wall and the direction of the alignment treatment conducted in the first alignment layer formation step is substantially parallel" means that the angle formed between the longitudinal direction of the linear partition wall and the direction of the alignment treatment conducted in the first alignment layer formation step is $0°\pm5°$ and preferably $0°\pm2°$.

As the material of the linear partition wall, a material usually used in the partition wall of liquid crystal displays may be used. Specifically, examples of the material of the linear partition wall may include resins, among which photosensitive resins are preferably used. This is because the photosensitive resins are easily patterned.

As the method of forming the linear partition wall, any of the usual patterning methods may be used without any particular limitation insofar as it can form the linear partition wall at a desired position. Examples of the method include a photolithographic method, an ink jet method and a screen printing method.

The linear partition wall is usually formed in plural and it is preferable that plural linear partition walls be formed regularly at desired positions and it is more preferable that plural linear partition walls be formed in substantially parallel at equal intervals. This is because if plural linear partition walls are formed at random positions, there is the case where it is difficult to exactly control the amount of a ferroelectric liquid crystal to be applied.

Although no particular limitation is imposed on the position of the linear partition wall, the linear partition wall is preferably formed in a non-pixel area. This is because it is desirable that the partition wall be formed in a non-pixel area having no influence on image display since an alignment defect of a ferroelectric liquid crystal is easily caused in the vicinity of the linear partition wall. When the liquid crystal side substrate is, for example, a TFT substrate, the linear partition walls may be provided on gate electrodes and source electrodes formed in matrix form.

The pitch of the linear partition walls is designed to be about 1 mm to 10 mm, preferably in a range from 1.0 mm to 5.0 mm and more preferably in a range from 2.0 mm to 3.0 mm. This is because if the pitch of the linear partition walls is less than the above range, there is the possibility that display qualities are deteriorated by the alignment defect of the ferroelectric liquid crystal in the vicinities of the linear partition walls, whereas if the pitch of the linear partition walls exceeds the above range, there is the case where desired impact resistance is not obtained and it is difficult to keep a constant cell gap, though depending on the size of the liquid crystal display. Here, the pitch of the linear partition walls means the distance between the centers of adjacent partition walls.

The width of the linear partition wall is designed to be about 1 μm to 50 μm, preferably in a range from 2 μm to 30 μm and more preferably in a range from 5 μm to 20 μm. This is because when the width of the linear partition wall exceeds the above range, the linear partition walls are also formed in the pixel area resultantly, leading to a decrease in effective pixel area and there is the case where good image display is not obtained, whereas when the width of the linear partition wall is less than the above range, there is the case where it is difficult to form the linear partition wall.

Moreover, the height of the linear partition wall is designed to be about the same size as the size of a cell gap.

The pitch, width and height of the linear partition walls may be measured using a scanning electron microscope (SEM) to observe the sections of the linear partition walls.

No particular limitation is imposed on the number of linear partition walls as long as the number of linear partition walls is two or more and the number is properly selected according to the size of the liquid crystal display.

The linear partition wall formation step may be carried out prior to the first alignment layer formation step, and the linear partition wall may be formed either on the first substrate or on the first electrode layer. In other words, the linear partition wall and the first electrode layer may be formed in this order or the first electrode layer and the linear partition wall may be formed in this order on the first substrate.

As will be described later, the linear partition wall formation step used to form a linear partition wall on the first substrate is not carried out when the linear partition wall formation step used to form a linear partition wall on the second substrate is carried out in the counter substrate preparation step. In other words, the linear partition wall may be formed either on the liquid crystal side substrate or on the counter substrate.

(4) Frame Partition Wall Formation Step

In the liquid crystal side substrate preparation step in the present invention, the frame partition wall formation step used to form the frame partition wall on the first substrate may be carried out prior to the first alignment layer formation step. This is because if, as illustrated in FIGS. 8A and 8B, a frame-like partition wall 8b is formed on the periphery of the first substrate 2, when a sealing agent 6 is coated on the outside periphery of the frame partition wall 8b, a ferroelectric liquid crystal 5 is prevented from being brought into contact with the sealing agent 6 which is in an uncured state, making it possible to avoid a deterioration in the properties of the ferroelectric liquid crystal caused by contamination of impurities and the like contained in the sealing agent.

As will be explained later, when the frame partition wall formation step used to form the frame partition wall on the second substrate is carried out in the counter substrate preparation step, the frame partition wall formation step used to form a frame partition wall on the first substrate is not carried. In other words, the frame partition wall may be formed either on the liquid crystal side substrate or on the counter substrate.

The material, method, position and other factors for forming the frame partition wall are the same as those of the linear partition wall described in the linear partition wall formation step and explanations thereof are omitted here.

The width of this frame partition wall only needs to be enough to prevent the ferroelectric liquid crystal from being brought into contact with the sealing agent in an uncured state. Specifically, the width of the frame partition wall is designed to be about 10 μm to 3 mm, preferably in a range from 10 μm to 1 mm and more preferably in a range from 10 μm to 500 μm. This is because when the width of the frame partition wall exceeds the above range, the partition walls are also formed in the pixel area resultantly, leading to a decrease in effective pixel area and there is the case where good image display is not obtained, whereas when the width of the frame partition wall is less than the above range, there is the case where it is difficult to form the frame partition wall.

Moreover, the height of the frame partition wall is designed to be about the same as the size of a cell gap.

The width and height of the frame partition wall may be measured using a scanning electron microscope (SEM) to observe the section of the frame partition wall.

There is no limitation to the order of the frame partition wall formation step insofar as it is carried out prior to the first alignment layer formation step, and the frame partition wall may be formed either on the first substrate or on the first electrode layer. In other words, the frame partition wall and the first electrode layer may be formed in this order or the first electrode layer and the frame partition wall may be formed in this order on the first substrate.

(5) Colored Layer Formation Step

In the step of preparing the liquid crystal side substrate in the present invention, a colored layer formation step used to form a colored layer on the first substrate may be carried out prior to the first alignment layer formation step. When a colored layer formation step used to form the colored layer on the second substrate in the counter substrate preparation step is carried out, the colored layer formation step used to form the colored layer on the first substrate is not carried out as will be explained later. In other words, the colored layer may be formed on any of the liquid crystal side substrate and the counter substrate.

When the colored layer is formed, a color filter system liquid crystal display that can realize color display by the colored layer can be obtained.

As the method of forming the colored layer, methods for forming colored layers in usual color filters may be used. As this method, the pigment dispersion methods (color resist method and etching method), the printing methods and the ink jet methods may be used.

2. Counter Substrate Preparation Step

The counter substrate preparation step in the present invention involves a second alignment layer formation step in which a second alignment layer-formation layer is formed on the second substrate on which the second electrode layer is formed and the second alignment layer-formation layer is subjected to alignment treatment to form a second alignment layer, to prepare a counter substrate in which the second electrode layer and the second alignment layer are formed in this order on the second substrate.

In the counter substrate preparation step, a columnar spacer formation step used to form a columnar spacer on the second substrate, a linear partition wall formation step used to form a linear partition wall on the second substrate, a frame partition wall formation step used to form a frame partition wall on the second substrate or the colored layer formation step used to form a colored layer on the second substrate may be carried out, prior to the second alignment layer formation step.

The second alignment layer formation step, the columnar spacer formation step, the linear partition wall formation step, the frame partition formation step and the colored layer formation step are the same as the first alignment layer formation step, the columnar spacer formation step, the linear partition wall formation step, the frame partition formation step and the colored layer formation step respectively in the liquid crystal side substrate preparation step, and therefore, explanations of these steps are omitted.

The compositions of the constituent materials of the first alignment layer and second alignment layer will be explained.

(1) Compositions of the Constituent Materials of the First Alignment Layer and the Second Alignment Layer Although no particular limitation is imposed on the combination of the materials used in the first alignment layer and the second alignment layer, the constituent materials of the first alignment layer and the constituent materials of the second alignment materials are preferably different from each other with the ferroelectric liquid crystal interposed therebetween. The reason is as follows. When the first alignment layer is formed of a material different from that of the second alignment layer, the polarities of the surface of the first alignment layer and that of the surface of the second alignment layer can be made different according to each material. This ensures that the polar surface interaction between the ferroelectric liquid crystal and the first alignment layer is different from the polar surface interaction between the ferroelectric liquid crystal and the second alignment layer and therefore, the generation of alignment defects such as zigzag defects, hairpin defects and double domains can be suppressed by properly selecting the material in consideration of the surface polarities of the first alignment layer and that of the second alignment layer. Particularly, the generation of a double domain can be efficiently suppressed, and therefore, mono-domain alignment can be obtained.

In order for the first alignment layer to have a different constituent material from that of the second alignment layer, for example, a method may be adopted in which: one of these layers is formed of a photo alignment layer and the other is formed of a rubbed layer, or one of these layers is formed of a laminate produced from an alignment layer for reactive liquid crystal and a fixed liquid crystal layer and the other is formed of a photo alignment layer or a rubbed layer. A method may also be adopted in which the both are formed of rubbed layers, which are made to have constituent materials differing from each other; or a method may be adopted in which the both are formed of photo alignment layers, which are made to have constituent materials differing from each other. In addition, a method may be adopted in which the both are formed of laminates of an alignment layer for reactive liquid crystal and a fixed liquid crystal layer and these laminates are made to have constituent materials differing from each other. In this way, the constituent material of the first alignment layer can be made different from that of the second alignment layer.

When the first alignment layer and the second alignment layer are photo alignment layers, a photo-isomerization material is used for one of the photo alignment layers and a photoreaction type material is used for the other, whereby the compositions of the constituent materials of the photo alignment layers can be made different from each other.

When the first alignment layer and the second alignment layer are photo alignment layers using a photo-isomerization material, appropriate ones are selected among various cis-trans isomerization reactive skeletons and substituents in the aforementioned photo-isomerization reactive compounds in accordance with required properties, whereby the compositions of the constituent materials of the photo alignment layers can be made different from each other. Moreover, the composition can be changed by changing the amount of the additives mentioned above.

When the first alignment layer and the second alignment layer are photoalignment layers using a photoreaction type material, an appropriate one is selected among above various photo-dimerization-reactive compounds, for example, photo-dimerization reactive polymers, whereby the compositions of the constituent materials of the photo alignment layers can be made different from each other. The composition can be changed by changing the amount of the additives mentioned above.

As the combination of materials to be used for the first alignment layer and the second alignment layer; a combination of a laminate prepared by laminating an alignment layer for reactive liquid crystal and a fixed liquid crystal layer as one of the alignment layers and a photo alignment layer or a rubbed layer as the other, a combination of a photo alignment layer using a photo-dimerization type material as the one and a photo alignment layer using a photo-isomerization type material as the other, a combination of a photo alignment layer using a photo-dimerization type material as the one and a rubbed layer as the other, or a combination of a photo alignment layer using a photo-isomerization type material or a rubbed layer as the one and a rubbed layer as the other is preferable among the above combinations. The fixed liquid crystal layer tends to have relatively stronger positive polarity than a photo alignment layer or a rubbed layer. Therefore, in the case of this combination, the negative electrode of the spontaneous polarization of a ferroelectric liquid crystal tends to direct toward the fixed liquid crystal layer side owing to polar surface interaction. A photo alignment layer using a photo-dimerization type material tends to have relatively stronger positive polarity than a photo alignment layer using a photo-isomerization type material. Therefore, in the case of this combination, the negative electrode of the spontaneous polarization of a ferroelectric liquid crystal tends to direct toward the side of the photo-alignment layer using a photo-dimerization type material owing to polar surface interaction. A photo alignment layer using a photo-dimerization type material tends to have relatively stronger positive polarity than a rubbed layer. Therefore, the negative electrode of the spontaneous polarization of a ferroelectric liquid crystal tends to direct toward the side of the photo-alignment layer using a photo-dimerization type material owing to polar surface interaction. A rubbed layer tends to have relatively stronger positive polarity than a photo alignment layer using a photo-isomerization material. Therefore, the negative electrode of the spontaneous polarization of a ferroelectric liquid crystal tends to direct toward the side of the rubbed layer side owing to polar surface interaction. In such combinations, the direction of the spontaneous polarization of a ferroelectric liquid crystal can be controlled, whereby the generation of alignment defects can be efficiently suppressed.

Particularly, the case where the first alignment layer is a laminate prepared by laminating an alignment layer for reactive liquid crystal and a fixed liquid crystal layer and the second alignment layer is a photo alignment layer or a rubbed layer; the case where the first alignment layer is a photo alignment layer using a photo-dimerization type material and the second alignment layer is a photo alignment layer using a photo-isomerization type material; the case where the first alignment layer is a photo alignment layer using a photo-dimerization type material and the second alignment layer is a rubbed layer; or the case where the first alignment layer is a rubbed layer and the second alignment layer is a photo alignment layer using a photo-isomerization type material is preferable. In the present invention, the ferroelectric liquid crystal is coated to the surface of the first alignment layer of the liquid crystal side substrate to manufacture a liquid crystal display. In the obtained liquid crystal display, the negative electrode of the spontaneous polarization of the ferroelectric liquid crystal tends to direct toward the liquid crystal side substrate side to which the ferroelectric liquid crystal is coated. In addition, as mentioned above, the fixed liquid crystal layer tends to have relatively stronger positive polarity than the photo alignment layer or the rubbed layer, the photo alignment layer using a photo-dimerization type material tends to have relatively stronger positive polarity than the photo alignment layer using a photo-isomerization type material, the photo alignment layer using a photo-dimerization type material tends to have relatively stronger positive polarity than the rubbed layer and the rubbed layer tends to have relatively stronger positive polarity than the photo alignment layer using a photo-isomerization type material. Therefore, in order to restrain alignment defects efficiently, the combinations above are preferably used as the combination of the materials to be used for the first alignment layer and the second alignment layer.

3. Liquid Crystal Coating Step.

The liquid crystal coating step is a step in which the ferroelectric liquid crystal is linearly coated to the surface of the first alignment layer of the liquid crystal side substrate in a direction substantially perpendicular or substantially parallel to the direction of the alignment treatment conducted in the first alignment layer formation step.

The ferroelectric liquid crystal used in the present invention and the method of coating the ferroelectric liquid crystal will be explained.

(1) Ferroelectric Liquid Crystal

The phase sequence of the ferroelectric liquid crystal used in the present invention is not particularly limited as long as a chiral smectic phase (SmC*) is expressed. Examples thereof include the following phase sequence expressed in the temperature lowering process: a phase sequence where a phase change of nematic phase (N)-cholesteric phase (Ch)-chiral smectic C phase (SmC*) advances; a phase sequence where a phase change of nematic phase (N)-chiral smectic C phase (SmC*) advances; a phase sequence where a phase change of nematic phase (N)-smectic A phase (SmA)-chiral smectic C phase (SmC*) advances; and a phase sequence where a phase change of nematic phase (N)-cholesteric phase (CH)-smectic A phase (5 mA)-chiral smectic C phase (SmC*) advances.

Figure 2:
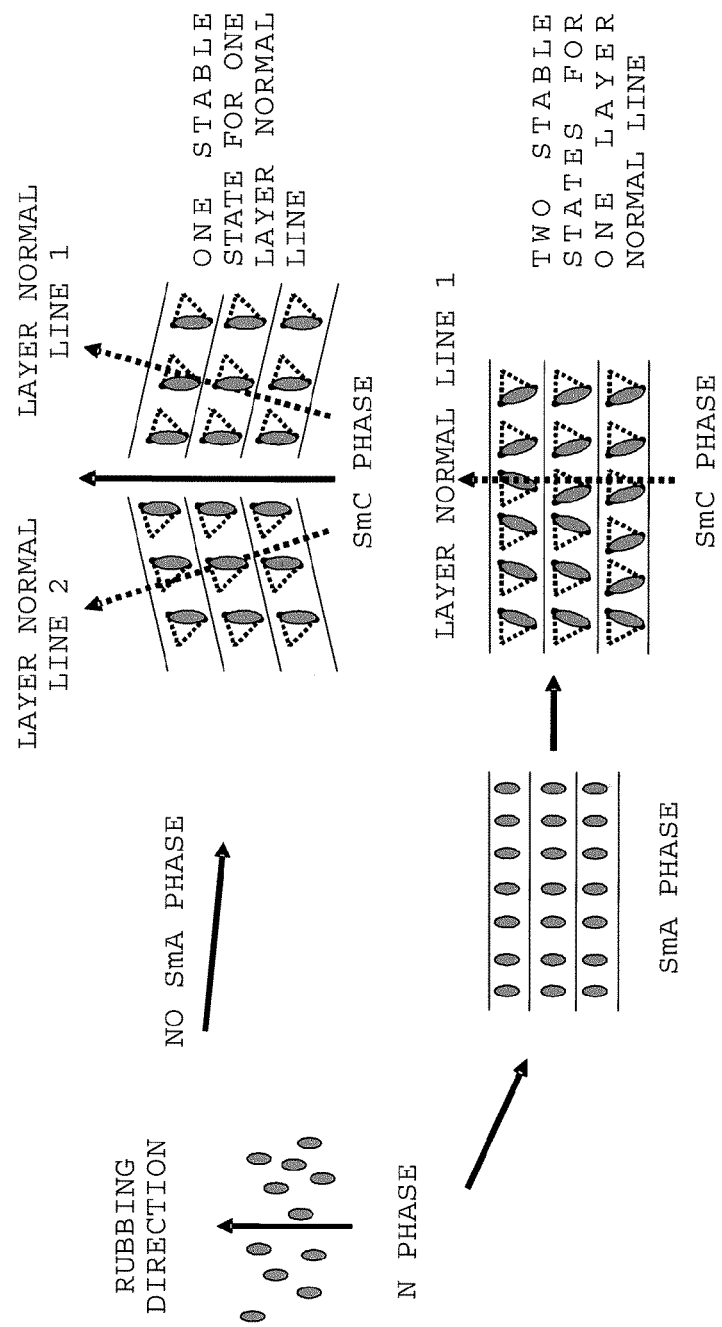
FIG. 2 is a view illustrating a difference of alignment based on a difference in the phase sequence that ferroelectric liquid crystal has.
Figure 3:
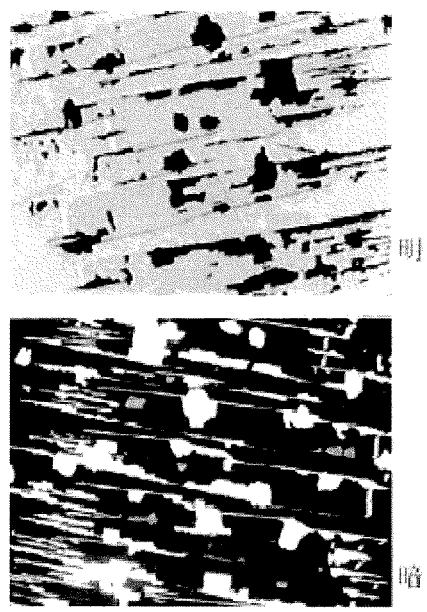
FIG. 3 is a photograph showing a double domain that is an alignment defect of a ferroelectric liquid crystal.

In general, the ferroelectric liquid crystal having the phase sequence passing through SmA phase as exemplified in the lower part of FIG. 2 has the layer interval of the smectic layer shorten in the phase change process so as to have a chevron structure with the smectic layer bent for compensating the volume change. According to the bent direction, a domain having a different longer axis direction of the liquid crystal molecule is formed so as to easily generate the alignment defect called the zigzag defect or the hairpin defect in the boundary surface, and thus it is problematic. Generally, in a ferroelectric liquid crystal having a phase sequence which exists without passing through SmA phase as illustrated in the upper part of FIG. 2, two domains (double domain) in which their layer normal lines are different from each other are easily generated. In the present invention, the ferroelectric liquid crystal is coated in a direction substantially perpendicular or substantially parallel to the direction of the alignment treatment conducted in the first alignment layer formation step, thereby making it possible to suppress the generation of such alignment defects.

The ferroelectric liquid crystal used in the present invention is preferably one which is obtained by not passing through the SmA phase among the above examples. This is because though, as mentioned above, ferroelectric liquid crystals obtained by not passing through the SmA phase give rise to alignment defects such as a double domain more easily, the generation of alignment defects such as a double domain can be restricted by coating the ferroelectric liquid crystal in a direction substantially perpendicular or substantially parallel to the direction of the alignment treatment conducted in the first alignment layer formation step.

When the liquid crystal display of the present invention is displayed by a field sequential color system, it is preferable to use a liquid crystal material exhibiting mono-stability. This is because when a liquid crystal material exhibiting mono-stability is used, the liquid crystal display can be driven by an active matrix system using a thin film transistor (TFT), and also, the gray scale can be controlled by voltage modulation, making it possible to attain a highly precise and high quality display.

In FIGS. 9A to 9C, in the ferroelectric liquid crystal, each of the liquid crystal molecules 15 is inclined from a layer normal line z, and rotates along the edge line of a cone having a bottom plane perpendicular to the layer normal line z. In this cone, the inclination angle of the liquid crystal molecules 15 to the layer normal line z is defined as the tilt angle θ.

The wording "exhibiting mono-stability" means that the state of a ferroelectric liquid crystal is stabilized in a single state when no voltage is applied thereto. Specifically, as illustrated in FIGS. 9A to 9C, each of the liquid crystal molecules 15 can move on the cone between two states that the molecule is inclined by tilt angles of ±θ to the layer normal line z; the wording means that the liquid crystal molecule 15 is stabilized in any one state between the states on the cone when no voltage is applied thereto.

As liquid crystal materials exhibiting mono-stability, specifically, the following is used: a ferroelectric liquid crystal having a half-V shaped switching (referred to as "HV-shaped switching" hereinafter) characteristics, in which the liquid crystal molecules operate only when either one of positive and negative voltages, as illustrated in lower left graph of FIG. 10, is applied thereto. Since a ferroelectric liquid crystal showing the HV-shaped switching is used, the opening time as a black and white shutter can be provided for a sufficiently long time. Thereby, each color to be switched by time can be displayed further brightly so that a bright color liquid crystal display can be realized.

The "HV-shaped switching characteristics" in the invention mean electrooptic characteristics of exhibiting an asymmetric light transmission in response to applied voltage.

Such a ferroelectric liquid crystal can be variously selected from generally-known liquid crystal materials in accordance with required properties.

The liquid crystal material which expresses a SmC* phase from a Ch phase without passing through SmA phase is particularly suitable as a material exhibiting HV-shaped switching characteristics. A specific example thereof is "R2301" manufactured by AZ Electronic Materials.

The liquid crystal material which passes through a 5 mA phase in its phase sequence is preferably a liquid crystal material which expresses a SmC* phase from a Ch phase passing through a SmA phase since the material can be selected from wide range. In this case, as such a ferroelectric liquid crystal, although a single material expressing the SmC* phase can be used, a material expressing the above-mentioned phase sequence by adding a small amount of a optically active substance not expressing the SmC phase itself but capable of inducing the spontaneous polarization and an appropriate spiral pitch to a low viscosity non-chiral liquid crystal easily expressing the SmC phase (hereinafter, it may be referred to as the host liquid crystal) is preferable. This is because it has low viscosity and capable of realizing a faster response.

As the host liquid crystal mentioned above, a material expressing the SmC phase in a wide temperature range is preferable. Those commonly known as a host liquid crystal for a ferroelectric liquid crystal can be used without limitation particularly. For example, a compound represented by the below-mentioned general formula:

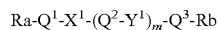

$Ra-Q^1-X^1-(Q^2-Y^1)_m-Q^3-Rb$ (in the formula, Ra and Rb are each a straight chain or branched alkyl group, an alkoxy group, an alkoxy carbonyl group, an alkanoyloxy group or an alkoxy carbonyloxy group; $Q^1$, $Q^2$ and $Q^3$ are each a 1,4-phenylene group, a 1,4-cyclohexylene group, a pyridine-2,5-diyl group, a pyradine-2,5-diyl group, a pyridazine-3,6-diyl group or a 1,3-dioxane-2,5-diyl group, in which these groups may have a substituent group such as a halogen atom, a hydroxyl group and a cyano group; $X^1$ and $Y^1$ are each —COO—, —OCO—, —CH$_2$O—, —OCH$_2$—, —CH$_2$CH$_2$—, —C≡C— or a single bond; and m is 0 or 1) can be used. As the host liquid crystal, the above-mentioned compounds can be used either alone by one kind or as a combination of two or more kinds.

The optically active substance to be added to the above-mentioned host liquid crystal is not particularly limited as long as it is a material having the large spontaneous polarization and the ability capable of inducing an appropriate spiral pitch. Those commonly known as a material to be added to a liquid crystal composition expressing the SmC phase can be used. In particular, a material capable of inducing the large spontaneous polarization by a small addition amount is preferable. As such an optically active substance, for example, a compound represented by the below-mentioned general formula:

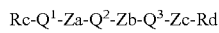

Rc-Q$^1$-Za-Q$^2$-Zb-Q$^3$-Zc-Rd (in the formula, each Q$^1$, Q$^2$, Q$^3$ denote the same things as in the above-mentioned general formula; Za and Zb are each —COO—, —OCO—, —CH$_2$O—, —OCH$_2$—, —CH$_2$CH$_2$—, —CH=N—, —N=N—, —N(→O)=N—, —C(=O)S— or a single bond; Rc is a straight chain or branched alkyl group, which may have an asymmetric carbon atom, an alkoxy group, an alkoxy carbonyl group, an alkanoyloxy group or an alkoxy carbonyloxy group; Rd is a straight chain or branched alkyl group having an asymmetric carbon atom, an alkoxy group, an alkoxy carbonyl group, an alkanoyloxy group or an alkoxy carbonyloxy group, and Rc and Rd each may be substituted with a halogen atom, a cyano group or a hydroxyl group) can be used. As the optically active substance, the above-mentioned compounds can be used either alone or as a combination of two or more kinds.

As the ferroelectric liquid crystal which passes through the SmA phase in its phase sequence, specifically, "FELIXM4851-100" commercially available from AZ Electronic Materials, or the like can be presented.

Compounds having desired functions may be added to the ferroelectric liquid crystal according to the functions required of a liquid crystal display. As these compounds, a polymerizable monomer may be given as an example. This is because when the polymerizable monomer is polymerized after adding the monomer to the ferroelectric liquid crystal and attaching substrates, the alignment of the ferroelectric liquid crystal is stabilized, that is, polymer-stabilized, with the result that high alignment stability is obtained.

The polymerizable monomer is not particularly limited as long as it is a compound generating a polymerized product by the polymerization reaction. As such a polymerizable monomer, a thermosetting resin monomer to generate the polymerization reaction by a heat treatment, and an active radiation curable resin monomer to generate the polymerization reaction by the irradiation of an active radiation can be presented. Among them, it is preferable to use an active radiation curable resin monomer. Since the thermosetting resin monomer requires the heat treatment for generating the polymerization reaction, the regular sequence of the ferroelectric liquid crystal may be deteriorated or the phase transition may be induced by such a heat treatment. On the other hand, according to the active radiation curable resin monomer, such risk can be eliminated so that the ferroelectric liquid crystal sequence can hardly be deteriorated by the generation of the polymerization reaction.

As the active radiation curable resin monomer, an electron beam curable resin monomer to generate the polymerization reaction by the irradiation of an electron beam, and a photo setting resin monomer to generate the polymerization reaction by the light irradiation can be presented. Among them, it is preferable to use a photo setting resin monomer because manufacturing process of a liquid crystal display can be simplified by using the photo setting resin monomer.

The photo setting resin monomer is not particularly limited as long as it generates the polymerization reaction by the irradiation of a light beam having a wavelength in a range of 150 nm to 500 nm. In particular, it is preferable to use an ultraviolet curable resin monomer to generate the polymerization reaction by the irradiation of a light beam having a wavelength in a range of 250 nm to 450 nm, in particular, in a range of 300 nm to 400 nm because it is advantageous in terms of the convenience in the irradiating device, or the like.

The polymerizable functional group of the ultraviolet curable resin monomer is not particularly limited as long as it generates the polymerization reaction by the irradiation of an ultraviolet ray of the above-mentioned wavelength range. In particular, it is preferable to use an ultraviolet curable resin monomer having an acrylate group.

The ultraviolet curable resin monomer may be a monofunctional monomer having one polymerizable functional group in one molecule, or a polyfunctional monomer having two or more polymerizable functional groups in one molecule. In particular, it is preferable to use a polyfunctional monomer. By using a polyfunctional monomer, a stronger polymer network can be formed and the intermolecular force and the polymer network at the photo alignment layer interface can be reinforced. Thereby, disturbance in the sequence of the ferroelectric liquid crystal by the temperature change of the liquid crystal layer can be restrained.

Among the polyfunctional monomer, it is preferable to use a bifunctional monomer having a polymerizable functional group on the both ends of the molecule. Since the polymerizable functional group is provided on the both ends of the molecule, a polymer network can be formed with a wide interval between the polymers so that decline of the driving voltage of the ferroelectric liquid crystal by the inclusion of a polymerized product of a polymerizable monomer in the liquid crystal can be prevented.

Among the ultraviolet curable resin monomer, it is preferable to use an ultraviolet curable liquid crystal monomer to realize the liquid crystal property. The reason why such an ultraviolet curable liquid crystal monomer is preferable is as follows. That is, since the ultraviolet curable liquid crystal monomer shows the liquid crystal property, it can be arranged regularly by the alignment limiting force of the alignment layer. Therefore, by generating the polymerization reaction after regularly arranging the ultraviolet curable liquid crystal monomer, it can be fixed while maintaining the regular sequence state. Since a polymerized product having such a regular sequence state is present, the alignment stability of the ferroelectric liquid crystal can be improved so that the liquid crystal display excellent in heat resistance and impact resistance can be obtained.

The liquid crystal phase of the ultraviolet curable liquid crystal monomer is not particularly limited, and for example, the nematic phase, the SmA phase, and the SmC phase can be presented.

As the ultraviolet curable liquid crystal monomer used in the present invention, for example, the compounds represented by a below formulae (20), (21) and (25) can be presented.

[Chemical Formula 14]

(20)
$$\text{H}_2\text{C}=\text{CHCOO}-\text{A}-\text{B}-\text{M}^1$$

(21)
$$\text{H}_2\text{C}=\text{CHCOO}-\text{D}-\text{E}-\text{F}-\text{M}^2$$

(25)
A diacrylate compound with two phenyl rings connected via O-propylene linkages, with substituent Y on the central biphenyl.

In the above-mentioned formulae (20) and (21), A, B, D, E and F are benzene, cyclohexane or pyrimidine, which may have a substituent group such as halogen. Moreover, A and B, or D and E may be bonded via a bonding group such as an acetylene group, a methylene group and an ester group. $M^1$ and $M^2$ may be any of a hydrogen atom, an alkyl group having 3 to 9 carbon atoms, an alkoxy carbonyl group having 3 to 9 carbon atoms, or a cyano group. Furthermore, an acryloyloxy group on the molecular chain end and A or D may be bonded via a bonding group such as an alkylene group having 3 to 6 carbon atoms.

In the formula (25), Y is hydrogen, alkyl having 1 to 20 carbon atoms, alkenyl having 1 to 20 carbon atoms, alkyloxy having 1 to 20 carbon atoms, alkyloxy carbonyl having 1 to 20 carbon atoms, formyl, alkyl carbonyl having 1 to 20 carbon atoms, alkyl carbonyloxy having 1 to 20 carbon atoms, halogen, cyano or nitro.

Out of the compounds represented by the above-mentioned formulae, the compounds of below-mentioned formulae can be presented as the specific compounds to be used preferably.

[Chemical Formula 15]

$\text{H}_2\text{C}=\text{CHCOO}-$[cyclohexane]-[cyclohexane]$-\text{C}_3\text{H}_7$ $\text{H}_2\text{C}=\text{CHCOO}-$[cyclohexane]-[cyclohexane]$-\text{C}_4\text{H}_9$ $\text{H}_2\text{C}=\text{CHCOO}-$[cyclohexane]-[cyclohexane]$-\text{C}_7\text{H}_{15}$ $\text{H}_2\text{C}=\text{CHCOO}-$[benzene]-[cyclohexane]$-\text{C}_3\text{H}_7$ $\text{H}_2\text{C}=\text{CHCOO}-$[benzene]-[cyclohexane]$-\text{C}_4\text{H}_9$ $\text{H}_2\text{C}=\text{CHCOO}-$[benzene]-[benzene]$-\text{OC}_8\text{H}_{17}$ $\text{H}_2\text{C}=\text{CHCOO}-$[benzene]-[benzene]$-\text{C}_{10}\text{H}_{21}$ $\text{H}_2\text{C}=\text{CHCOO}-$[benzene]-[benzene]$-\text{COOC}_5\text{H}_{11}$ $\text{H}_2\text{C}=\text{CHCOO}-$[benzene]-[benzene]$-\text{COOC}_6\text{H}_{13}$ $\text{H}_2\text{C}=\text{CHCOO}-$[benzene]-[benzene]$-\text{COOC}_7\text{H}_{15}$ $\text{H}_2\text{C}=\text{CHCOO}-$[benzene]-[benzene]$-\text{COOC}_8\text{H}_{17}$

[Chemical Formula 16]

$\text{H}_2\text{C}=\text{CHCOO}-$[benzene]-[benzene]$-\text{COO}-\text{CH}(*)-\text{C}_2\text{H}_5$ $\text{H}_2\text{C}=\text{CHCOO}-$[benzene]-[benzene]$-\text{COO}-\text{CH}(*)\text{CH}_3-\text{C}_4\text{H}_9$ $\text{H}_2\text{C}=\text{CHCOO}-$[benzene]-[pyrimidine]$-\text{C}_6\text{H}_{13}$ $\text{H}_2\text{C}=\text{CHCOO}-$[benzene]-[pyrimidine]$-\text{C}_9\text{H}_{19}$ $\text{H}_2\text{C}=\text{CHCOO}-$[benzene]$-\text{CH}_2\text{CH}_2-$[cyclohexane]$-\text{C}_3\text{H}_7$ $\text{H}_2\text{C}=\text{CHCOO}-$[benzene]$-\text{C}\equiv\text{C}-$[benzene]$-\text{C}_3\text{H}_7$ $\text{H}_2\text{C}=\text{CHCOO}-$[benzene]$-\text{C}\equiv\text{C}-$[benzene]$-\text{C}_4\text{H}_9$ $\text{H}_2\text{C}=\text{CHCOO}-$[benzene]$-\text{C}\equiv\text{C}-$[benzene]$-\text{C}_5\text{H}_{11}$

[Chemical Formula 17]

$\text{H}_2\text{C}=\text{CHCOO}-$[cyclohexane]-[cyclohexane]-[cyclohexane]$-\text{C}_3\text{H}_7$ $\text{H}_2\text{C}=\text{CHCOO}-$[cyclohexane]-[cyclohexane]-[cyclohexane]$-\text{C}_4\text{H}_9$ $\text{H}_2\text{C}=\text{CHCOO}-$[cyclohexane]-[cyclohexane]-[benzene(3,4-F_2)]

$\text{H}_2\text{C}=\text{CHCOO}-$[cyclohexane]-[cyclohexane]-[benzene(3,4,5-F_3)]

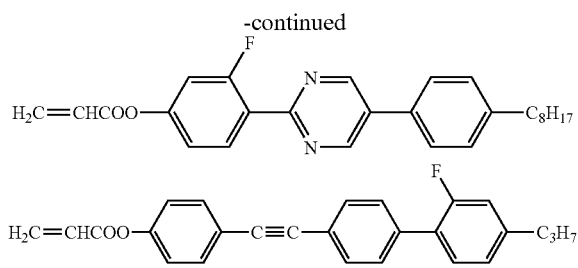

The polymerizable monomer used may be a single polymerizable monomer, or a combination of two or more different polymerizable monomers. In the case of using two or more different polymerizable monomers, for example, an ultraviolet curable liquid crystal monomer shown in the above-mentioned formulae and another ultraviolet curable resin monomer can be used.

In the case the ultraviolet curable liquid crystal monomer is used as the polymerizable monomer, the polymerized product obtained by polymerizing the polymerizable monomer used may be a main chain liquid crystalline polymerized product with the main chain showing the liquid crystalline property for an atomic group showing the liquid crystalline property provided in the main chain, or a side chain liquid crystalline polymerized product with the side chain showing the liquid crystalline property for an atomic group showing the liquid crystalline property provided in the side chain. Among them, a side chain liquid crystalline polymerized product is preferable. Since an atomic group showing the liquid crystalline property is present in the side chain, the freedom of the atomic group becomes high so that the atomic group showing the liquid crystalline property can be aligned easily. Moreover, as a result, the alignment stability of the ferroelectric liquid crystal can be improved.

The added amount of the polymerizable monomer in the liquid crystal layer is not particularly limited as long as it is in a range capable of providing the sequence stability of the ferroelectric liquid crystal to a desirable degree. In general, it is preferably in a range of 0.5% by mass to 30% by mass to the total of the ferroelectric liquid crystal and the polymerizable monomer, more preferably in a range of 1% by mass to 20% by mass, and particularly preferably in a range of 1% by mass to 10% by mass. In the case the added amount of the polymerizable monomer is more than the above-mentioned range, increase in the driving voltage of the ferroelectric liquid crystal and the decline in the response speed may be generated. Moreover, in the case it is less than the above-mentioned range, due to the insufficiency of the sequence stability in the ferroelectric liquid crystal, the heat resistance and the impact resistance of the liquid crystal display may be deteriorated.

(2) Method of Coating the Ferroelectric Liquid Crystal

In the present invention, the ferroelectric liquid crystal is linearly coated to the surface of the first alignment layer of the liquid crystal side substrate in a direction substantially perpendicular or substantially parallel to the direction of the alignment treatment conducted in the first alignment layer formation step.

The description reading: "the ferroelectric liquid crystal is linearly coated in a direction substantially perpendicular to the direction of the alignment treatment conducted in the first alignment layer formation step" means that the angle formed between the direction of the alignment treatment conducted in the first alignment layer formation step and the coating direction (direction of the straight line of the linear coating pattern) of the ferroelectric liquid crystal is in a range of 90°±5° and preferably 90°±2°. The description reading "the ferroelectric liquid crystal is linearly coated in a direction substantially parallel to the direction of the alignment treatment in conducted the first alignment layer formation step" means that the angle formed between the direction of the alignment treatment conducted in the first alignment layer formation step and the coating direction (direction of the straight line of the linear coating pattern) of the ferroelectric liquid crystal is in a range of 0°±5° and preferably 0°±2°.

Particularly, it is preferable to linearly coat the ferroelectric liquid crystal to the surface of the first alignment layer of the liquid crystal side substrate in a direction perpendicular to the direction of the alignment treatment conducted in the first alignment layer formation step.

When, in the present invention, the step of forming a linear partition wall is carried out in the step of preparing a liquid crystal side substrate, a ferroelectric liquid crystal 5 is coated in the form of plural straight lines between adjacent linear partition walls 8a in a direction substantially parallel to the longitudinal direction m of the linear partition walls 8a as shown in FIGS. 8A and 8B in the liquid crystal coating step. This is because if the ferroelectric liquid crystal is coated in this manner, it can be coated in a direction substantially perpendicular or substantially parallel to the direction of the alignment treatment conducted in the first alignment layer formation step, with the result that the generation of alignment defects can be efficiently suppressed.

When, as shown in, for example, FIG. 8A, the angle formed between the longitudinal direction m of the linear partition wall 8a and the direction d of the alignment treatment conducted in the first alignment layer formation step is substantially parallel, and the angle formed between the longitudinal direction m of the linear partition wall 8a and the coating direction n of the ferroelectric liquid crystal is substantially parallel, the ferroelectric liquid crystal 5 can be linearly coated in a direction substantially perpendicular to the direction d of the alignment treatment conducted in the first alignment layer formation step.

When, as shown in, for example, FIG. 8B, the angle formed between the longitudinal direction m of the linear partition wall 8a and the direction d of the alignment treatment conducted in the first alignment layer formation step is substantially parallel, and the angle formed between the longitudinal direction m of the linear partition wall 8a and the coating direction n of the ferroelectric liquid crystal is substantially parallel, the ferroelectric liquid crystal 5 can be linearly coated in a direction substantially parallel to the direction d of the alignment treatment conducted in the first alignment layer formation step.

Because the ferroelectric liquid crystal is coated in the form of plural linear lines at fixed intervals, the ferroelectric liquid crystal is limited in its travel direction as mentioned above and therefore, the distance at which the ferroelectric liquid crystal flows can be more shortened and the area where the ferroelectric liquid crystal spreads can be reduced compared to the case of coating the ferroelectric liquid crystal in the form of dots. This method therefore can suppress the generation of aligning disorder at the boundary where the fluid ferroelectric liquid crystals are brought into contact with each other.

The description "the ferroelectric liquid crystal is linearly coated in a direction substantially parallel to the longitudinal direction of the linear partition wall" means that the angle formed between the direction of the alignment treatment conducted in the first alignment layer formation step and the coating direction (direction of the straight line of the linear coating pattern) of the ferroelectric liquid crystal is in a range of 0°±5° and preferably 0°±2°.

When the ferroelectric liquid crystal is coated to the surface of the first alignment layer of the liquid crystal side substrate, the ferroelectric liquid crystal may be or may not be warmed. The temperature of the ferroelectric liquid crystal is appropriately selected according to the coating method of the ferroelectric liquid crystal which will be explained later.

For example, when a jetting method is used as the coating method of the ferroelectric liquid crystal, it is preferable to warm the ferroelectric liquid crystal up to the temperature at which the ferroelectric liquid crystal exhibits an isotropic phase or a nematic phase and preferably up to the temperature at which the ferroelectric liquid crystal exhibits an isotropic phase. This is because if the ferroelectric liquid crystal is not warmed, the viscosity of the ferroelectric liquid crystal is too high, causing a jetting nozzle to be clogged and it is therefore very difficult to jet the ferroelectric liquid crystal stably.

In the above case, the temperature of the ferroelectric liquid crystal is set to the temperature at which the ferroelectric liquid crystal exhibits an isotropic phase or nematic phase. The specific temperature is different depending on the type of ferroelectric liquid crystal and a proper temperature is selected in accordance with the type of ferroelectric liquid crystal. The upper limit of the temperature of the ferroelectric liquid crystal is designed to be the temperature at which there is no fear as to the deterioration of the ferroelectric liquid crystal. Generally, the temperature of the ferroelectric liquid crystal is set to a temperature close to the nematic phase-isotropic phase transition temperature or to a temperature 0° C. to 10° C. higher than the nematic phase-isotropic phase transition temperature.

When a jetting method is used as the coating method of the ferroelectric liquid crystal, it is preferable to warm the ferroelectric liquid crystal so that the viscosity of the ferroelectric liquid crystal is 30 mPa·s or less and preferably in a range from 10 mPa·s to 20 mPa·s. This is because if the viscosity of the ferroelectric liquid crystal is too high, a jetting nozzle is clogged, which makes it very difficult to jet the ferroelectric liquid crystal stably.

When the coating method or printing method is used as the coating method of the ferroelectric liquid crystal, the ferroelectric liquid crystal is not preferably warmed. The reason is as follows. Specifically, when the coating method or printing method is used, a ferroelectric liquid crystal solution prepared by diluting the ferroelectric liquid crystal with a solvent is preferably used to improve coatability. Therefore, if the ferroelectric liquid crystal solution is warmed, the solvent in the ferroelectric liquid crystal solution is vaporized, making it difficult to coat the ferroelectric liquid crystal.

When the ferroelectric liquid crystal is coated to the first alignment layer of the liquid crystal side substrate, the liquid crystal side substrate may be or may not be heated. The temperature of the liquid crystal side substrate is properly selected according to the coating method of the ferroelectric liquid crystal.

When, for example, the jetting method is used as the coating method of the ferroelectric liquid crystal, the liquid crystal side substrate may be or may not be heated.

When the liquid crystal side substrate is heated, the temperature of the liquid crystal side substrate is preferably set to the temperature at which the ferroelectric liquid crystal exhibits an isotropic phase or nematic phase and particularly preferably to the temperature at which the ferroelectric liquid crystal exhibits an isotropic phase. The specific temperature is different depending on the type of ferroelectric liquid crystal and a proper temperature is selected in accordance with the type of ferroelectric liquid crystal. The upper limit of the temperature of the liquid crystal side substrate is designed to be the temperature at which there is no fear as to the deterioration of the ferroelectric liquid crystal. Generally, the temperature of the liquid crystal side substrate is set to a temperature close to the nematic phase-isotropic phase transition temperature or to a temperature 5° C. to 10° C. higher than the nematic phase-isotropic phase transition temperature.

When the liquid crystal side substrate is heated, the ferroelectric liquid crystal coated to the liquid crystal side substrate starts flowing just when it is coated.

When the coating method or printing method is used as the coating method of the ferroelectric liquid crystal, on the other hand, the liquid crystal side substrate is not preferably heated. This is because when the liquid crystal side substrate is heated, the solvent in the ferroelectric liquid crystal solution is vaporized and there is therefore a fear as to the aligning disorder of the ferroelectric liquid crystal.

Any solvent may be used as the solvent used in the ferroelectric liquid crystal solution without any particular limitation as long as it can dissolve or disperse the ferroelectric liquid crystal and the like. As the solvent, for example, methylene chloride, chloroform, toluene, xylene, tetrahydrofuran, acetone, methyl ethyl ketone or ethyl acetate may be used. These solvents may be used either singly or in combinations of two or more.

The concentration of the ferroelectric liquid crystal in the ferroelectric liquid crystal solution is selected properly in accordance with the coating method, a desired layer thickness and the like.

In the present invention, it is sufficient to coat the ferroelectric liquid crystals in the form of straight lines in a direction substantially perpendicular or substantially parallel to the direction of the alignment treatment conducted in the first alignment layer formation step. It is particularly preferable to coat the ferroelectric liquid crystals in the form of plural linear lines at such intervals as to prevent aligning disorder at the boundary where the fluid ferroelectric liquid crystals are brought into contact with each other when the linearly coated ferroelectric liquid crystals flow on the first alignment layer. If the flow distance of the ferroelectric liquid crystal is too long or the area where the ferroelectric liquid crystal spreads is too large when the ferroelectric liquid crystal flows in an isotropic phase on the first alignment layer, there is a fear as to aligning disorder at the boundary where the fluid ferroelectric liquid crystals are brought into contact with each other.

Moreover, it is preferable to coat the ferroelectric liquid crystal in the form of plural linear lines regularly and it is particularly preferable to coat the ferroelectric liquid crystal in the form of plural linear lines at equal intervals. This is because when the positions where the ferroelectric liquid crystal is coated are random, there is a fear as to the existence of parts where no ferroelectric liquid crystal is filled between the liquid crystal side substrate and the counter substrate.

Specifically, the ferroelectric liquid crystal is preferably coated in the form of plural linear lines at intervals of 3 mm or less. The above interval is preferably in a range from 0.5 mm to 2 mm, though it differs depending on the type of ferroelectric liquid crystal and coating method. This is because if the ferroelectric liquid crystal is coated in the form of plural linear lines at such intervals, the aligning disorder at the boundary where the fluid ferroelectric liquid crystals are brought into contact with each other can be suppressed efficiently.

Any method may be used as the coating method of the ferroelectric liquid crystal without any particular limitation insofar as it is a method in which the ferroelectric liquid crystal can be linearly coated in a direction substantially perpendicular or substantially parallel to the direction of the alignment treatment conducted in the first alignment layer formation step and also, the ferroelectric liquid crystal can be coated in a fixed amount which can be sealed. The coating method is preferably one in which the ferroelectric liquid crystal can be coated in the form of plural linear lines at such intervals as to prevent the generation of aligning disorder at the boundary where the fluid ferroelectric liquid crystals are brought into contact with each other when the linearly coated ferroelectric liquid crystal flow on the first alignment layer.

Examples of such a coating method include jetting methods such as an ink jet method and a dispenser method, coating methods such as a bar coating method and a slot die coating method, and printing methods such as a flexo printing method, a gravure printing method, an offset printing method and a screen printing method. Among these methods, jetting methods are preferable and particularly, an ink jet method is preferable. This is because if the ink jet method is used, the ferroelectric liquid crystal can be coated in the form of serial dots and also in the form of plural linear lines at fixed intervals, and therefore, the ferroelectric liquid crystal can be coated in such a manner as to decrease the flow distance, with a result that this method can efficiently limit the aligning disorder at the boundary where the ferroelectric liquid crystals that flow after being coated are brought into contact with each other. The screen printing method is also preferable. This is because if the screen printing method is used, the ferroelectric liquid crystal can be linearly coated at fixed intervals in the same manner as in the ink jet method and therefore, the ferroelectric liquid crystal can be coated in such a manner as to decrease the flow distance, with a result that this method can efficiently limit the aligning disorder at the boundary where the ferroelectric liquid crystals that flow after being coated are brought into contact with each other.

When an ink jet method is used, the amount of liquid droplets of the ferroelectric liquid crystal is preferably in a range from 1 pl (picoliter) to 1000 pl, more preferably in a range from 2 pl to 200 pl and even more preferably in a range from 10 pl to 100 pl per one jet. This is because when the amount of liquid droplets exceeds the above range, the flow distance of the ferroelectric liquid crystal is longer and the area where the ferroelectric liquid crystal spreads is larger, arousing a fear as to the generation of aligning disorder, whereas when the amount of liquid droplets is less than the above range, the time required to coat the ferroelectric liquid crystal is extremely increased. In conventional cases, the amount of liquid droplets of a ferroelectric liquid crystal to be jetted is about 10 ng per one jet and therefore, it is understood that the amount of liquid droplets of the above range is relatively small.

There is no limitation to the position where the ferroelectric liquid crystal is coated insofar as the ferroelectric liquid crystal is coated in a fixed amount which can be sealed.

4. Substrate Attaching Step

The substrate attaching step in the present invention is a step in which the liquid crystal side substrate to which the ferroelectric liquid crystal is coated and the counter substrate are provided to face each other such that the direction of the alignment treatment conducted in the first alignment layer formation step and the direction of the alignment treatment conducted in the second alignment layer formation step are substantially parallel to each other, and the both substrates are attached to each other.

Before the liquid crystal side substrate is attached to the counter substrate, a sealing agent is coated to the peripheral part of at least one of the liquid crystal side substrate or the counter substrate. As illustrated in FIG. 5, a sealing agent 6 is usually coated in frame so as to surround the region where the ferroelectric liquid crystal 5 is coated. As is illustrated in FIGS. 8A and 8B, the sealing agent 6 is coated so as to surround the outside periphery of a frame partition wall 8*b* when the frame partition wall 8*b* is formed.

When the sealing agent is coated to the liquid crystal side substrate, it may be coated either to the surface of the first substrate or to the first alignment layer. When the sealing agent is coated to the surface of the first substrate, the adhesion between the liquid crystal side substrate and the counter substrate can be improved. When the sealing agent is coated to the surface of the first substrate, the first alignment layer is formed in pattern in such a manner that the first alignment layer is not formed on the peripheral part of the first substrate. When the sealing agent is coated to the counter substrate on the other hand, the sealing agent may also be coated either to the surface of the second substrate or to the surface of the second alignment layer.

In relation to the columnar spacer or linear partition wall, the sealing agent may be coated to a substrate on which the columnar spacer and the linear partition wall are formed, to a substrate on which the columnar spacer and the linear partition wall are not formed or to the both substrates. In relation to the ferroelectric liquid crystal, the sealing agent may be coated to the liquid crystal side substrate to which the ferroelectric liquid crystal is coated, to the counter substrate to which no ferroelectric liquid crystal is coated or to the both substrates. In any case, the sealing agent is coated so as to surround the region where the ferroelectric liquid crystal is coated when the liquid crystal side substrate and the counter substrate are laminated on each other.

When the sealing agent is coated to the liquid crystal side substrate, it may be coated either before or after the ferroelectric liquid crystal is coated to the liquid crystal side substrate.

As the sealing agent, a sealing agent usually used in liquid crystal displays may be used and examples of the sealing agent include heat-curable resins and ultraviolet ray-curable resins.

As the coating method of the sealing agent, any method may be used insofar as it can coat the sealing agent at a fixed position and examples of the coating method include a dispenser method and a screen printing method.

After the sealing agent is coated in this manner, the liquid crystal side substrate and the counter substrate are laminated. When the liquid crystal side substrate and the counter substrate are laminated, the both are made to face each other such that the direction of the alignment treatment conducted in the first alignment layer formation step is substantially parallel to the direction of the alignment treatment conducted in the second alignment layer formation step.

When the liquid crystal side substrate and the counter substrate are laminated, both substrates are heated. The temperature of the both is preferably set to the temperature at which the ferroelectric liquid crystal exhibits an isotropic phase or a nematic phase and particularly preferably set to the temperature at which the ferroelectric liquid crystal exhibits an isotropic phase. The specific temperature is different depending on the type of ferroelectric liquid crystal and is properly selected. The upper limit of the temperature of the liquid crystal side substrate and counter substrate is designed to be a temperature at which the ferroelectric liquid crystal is not deteriorated. Usually, the temperature of the liquid crystal side substrate and counter substrate is set to a temperature close to the nematic phase-isotropic phase transition temperature or to a temperature 5° C. to 10° C. higher than the nematic phase-isotropic phase transition temperature.

The liquid crystal side substrate and the counter substrate are preferably heated such that the viscosity of the ferroelectric liquid crystal is 30 mPa·s or less and preferably in a range from 10 mPa·s to 20 mPa·s. This is because the flow of the ferroelectric liquid crystal on the first alignment layer becomes difficult if the viscosity of the ferroelectric liquid crystal is too high.

When a ferroelectric liquid crystal solution prepared by diluting the ferroelectric liquid crystal is coated to the surface of the first alignment layer by the printing method, a solvent can be removed when the liquid crystal side substrate is heated.

Moreover, when the liquid crystal side substrate and the counter substrate are laminated on each other, the chamber is evacuated to reduce the pressure between the liquid crystal side substrate and the counter substrate sufficiently. This prevents voids from remaining in the liquid crystal cell.

After the liquid crystal side substrate and the counter substrate are made to face each other in this manner, the both are laminated on each other under reduced pressure to apply fixed pressure to the both so as to make the cell gap uniform. Then, the pressure in the chamber is returned to normal pressure to thereby apply more pressure between the liquid crystal side substrate and the counter substrate. The cell gap is thereby made more uniform. Thus, the liquid crystal side substrate and the counter substrate are pressure-bonded to each other with a sealing agent disposed therebetween.

After the liquid crystal side substrate and the counter substrate are laminated on each other, the sealing agent is cured to attach the liquid crystal side substrate to the counter substrate.

The method of curing the sealing agent differs depending on the type of sealing agent, and example of the method include a method in which the sealing agent is irradiated with ultraviolet rays and a method in which the sealing agent is heated. At this time, usually, the sealing agent is cured while maintaining the pressure under which the liquid crystal side substrate and the counter substrate are laminated.

After the liquid crystal side substrate and the counter substrate is attached, the ferroelectric liquid crystal sealed between the liquid crystal side substrate and the counter substrate is aligned. Specifically, the ferroelectric liquid crystal is put into the chiral smectic C (SmC*) phase state. Since, as mentioned above, the liquid crystal side substrate and the counter substrate are warmed to a fixed temperature and the ferroelectric liquid crystal is thereby heated into, for example, the state of a nematic phase or isotropic phase, the ferroelectric liquid crystal can be put into the SmC* phase state by cooling it.

When the warmed ferroelectric liquid crystal is cooled, it is usually cooled gradually to room temperature.

When a polymerizable monomer is added to the ferroelectric liquid crystal, the ferroelectric liquid crystal is aligned and then, the polymerizable monomer is polymerized. As to the method of polymerizing the polymerizable monomer, an appropriate method is selected according to the type of polymerizable monomer. When, for example, an ultraviolet ray-curable resin monomer is used as the polymerizable monomer, the polymerizable monomer can be polymerized by applying ultraviolet rays.

When the polymerizable monomer is polymerized, the polymerizable monomer is preferably polymerized in the state where no voltage is applied across a liquid crystal layer though voltage may or may not be applied to the liquid crystal layer constituted of the ferroelectric liquid crystal.

The thickness of the liquid crystal layer constituted of the ferroelectric liquid crystal is preferably in a range from 1.2 µm to 3.0 µm, more preferably in a range from 1.3 µm to 2.5 µm, and even more preferably 1.4 µm to 2.0 µm. This is because when the thickness of the liquid crystal layer is too small, there is a fear as to reduced contrast whereas when the thickness of the liquid crystal layer is too large, there is the possibility that the ferroelectric liquid crystal is scarcely aligned. The thickness of the liquid crystal layer may be adjusted by a columnar spacer, linear partition wall, frame partition wall or the like.

5. Method for Driving the Liquid Crystal Display

The liquid crystal display of the present invention is suitable for being displayed by a field sequential color system, in which each pixel is subjected to time sharing and high speed response properties is in particular required in order to obtain good moving image display properties, since high speed response properties of the ferroelectric liquid crystal can be utilized.

The method for driving the liquid crystal display is not limited to any field sequential method, and may be a color filter system in which a color display is attained by using the above-mentioned colored layer.

The liquid crystal display is preferably driven by an active matrix system using the thin film transistor (TFT). The adoption of the active matrix system using TFT makes it possible to attain high-quality display since target pixels can be certainly lighted on or off.

Figure 11:
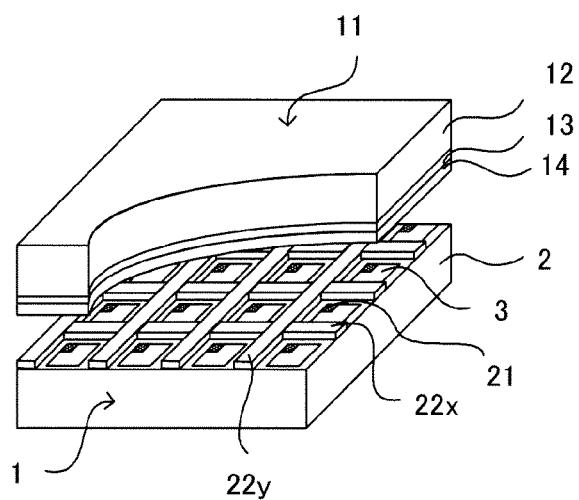
FIG. 11 is a schematic perspective view showing an example of a liquid crystal display obtained by a process for a liquid crystal display according to the present invention.

FIG. 11 shows an example of a liquid crystal display driven by the active matrix system using TFT. The liquid crystal display illustrated in FIG. 11 is provided with a TFT substrate (liquid crystal side substrate) 1 in which a TFT element 21 is arranged on a first substrate 2, and a common electrode substrate (counter substrate) 11 in which a common electrode (second electrode layer) 13 and a second alignment layer 14 are formed on a second substrate 12. In the TFT substrate (liquid crystal side substrate) 1, gate electrodes 22$x$, source electrodes 22$y$ and pixel electrodes (first electrode layer) 3 are formed. These gate electrodes 22$x$ and source electrodes 22$y$ are arranged in vertical directions and in horizontal directions respectively, wherein signals are applied to the gate electrodes 22$x$ and source electrodes 22$y$ to operate the TFT element 21, whereby the ferroelectric liquid crystal can be driven. The parts where the gate electrodes 22$x$ and the source electrodes 22$y$ cross each other are insulated by an insulation layer (not shown), so that the signals of the gate electrode 22$x$ and the signals of the source electrode 22$y$ can act independently. The part enclosed by the gate electrode 22$x$ and the source electrode 22$y$ is a pixel which is a minimum unit that drives the liquid crystal display. In each pixel, at least one or more TFT elements 21 and pixel electrodes (first electrode layer) 3 are formed. Then, the TFT element of each pixel can be operated by applying signal voltage to the gate electrode and source electrode sequentially. In FIG. 11, the liquid crystal layer and the first alignment layer are omitted.

In the above example, the liquid crystal side substrate is a TFT substrate and the counter substrate is a common electrode substrate. However, the present invention is not limited to this structure and the liquid crystal side substrate may be a common electrode substrate and the counter substrate may be a TFT substrate.

The liquid crystal display may be driven in a segment mode.

The present invention is not limited to the above-mentioned embodiments. The embodiments are examples, and all modifications having substantially the same structure and producing the same effects and advantages as the technical concept recited in the claims of the present invention are included in the technical scope of the invention.

EXAMPLES

The present invention will be explained in more detail by way of examples and comparative examples.

Example 1

First, a glass substrate with an ITO electrode formed thereon was thoroughly washed and a transparent resist (trade name: NN780, manufactured by JSR Corporation) was coated to the surface of the glass substrate by spin coating, which was then dried under reduced pressure and pre-baked at 90° C. for 3 minutes. Then, the glass substrate was exposed to ultraviolet light at a dose of 100 mJ/cm$^2$ through a mask. The substrate was subsequently developed by an inorganic alkali solution and post-baked at 230° C. for 30 minutes. By the above process, a columnar spacer 1.5 μm in height was formed.

Next, a 2 wt % cyclopentanone solution of a photo dimerization type material (trade name: ROP-103, manufactured by Rolic Technologies Ltd.) was coated to the surface of the glass substrate on which the columnar spacer was formed, by spin coating at a rotation of 1500 rpm for 15 seconds and then dried at 130° C. for 10 minutes. Then, the glass substrate was irradiated with linearly polarized ultraviolet rays at a dose of about 100 mJ/cm$^2$ at 25° C. to carry out alignment treatment. Moreover, a 2 wt % cyclopentanone solution of a polymerizable liquid crystal material (trade name: ROF-5101, manufactured by Rolic Technologies Ltd.) was coated to the photo alignment layer using the photo-dimerization type material by spin coating, then dried at 55° C. for 3 minutes, and subsequently, irradiated with non-polarized ultraviolet rays at 55° C. at a dose of 1000 mJ/cm$^2$, to thereby obtain a liquid crystal side substrate.

Next, a glass substrate with an ITO electrode formed thereon was thoroughly washed and a 2 wt % cyclopentanone solution of a photo dimerization type material (trade name: ROP-102, manufactured by Rolic Technologies Ltd.) was coated to the surface of the glass substrate by spin coating at a rotation of 1500 rpm for 15 seconds and then dried at 130° C. for 15 minutes. Then, the glass substrate was irradiated with linearly polarized ultraviolet rays at 25° C. at a dose of about 100 mJ/cm$^2$ to carry out alignment treatment. A counter substrate was thus obtained.

Then, the liquid crystal side substrate was placed on a single axis stage set to room temperature (23° C.) and ferroelectric liquid crystals (trade name: R2301, manufactured by AZ Electronic Materials) were jetted in the state of an isotropic phase by using an ink jet device (trade name: SE-128, manufactured by Dimatix Inc.) at a frequency of about 3600 Hz for one second while moving the stage at a rate of about 60 mm/second, to form plural linear lines at intervals of 1 mm. At this time, the coating direction (direction of straight lines of a linear coating pattern) of the ferroelectric liquid crystals was designed to form angles of 0°, 5°, 10°, 30°, 45°, 60°, 80°, 85° and 90° with the direction of the alignment treatment.

Subsequently, an ultraviolet/heat-curable sealing agent (trade name: WORLD ROCK 718, manufactured by Kyoritsu Chemical & Co., ltd.) was coated to the periphery of this liquid crystal side substrate by using a seal dispenser.

Next, a hot plate disposed in a vacuum chamber was heated to 110° C. and the liquid crystal side substrate on which the ferroelectric liquid crystal was coated was placed on the hot plate. Then, the counter substrate was adsorbed by an adsorbing plate heated to 110° C., and the liquid crystal side substrate and the counter substrate were made to face each other such that the directions of the alignment treatment of the alignment layers of these substrates were parallel to each other. In succession, the vacuum chamber was evacuated such that the pressure between both substrates was sufficiently reduced and under this condition, both substrates were stuck to each other and fixed pressure was applied to the both, followed by returning the pressure in the vacuum chamber to normal pressure. Then, ultraviolet rays were applied at a dose of 1 J/cm$^2$ to cure the ultraviolet-curable type sealing agent, thereby bonding both substrates to each other. Next, the liquid crystal cell is gradually cooled to room temperature to align the ferroelectric liquid crystals. Thus, 9 types of devices for evaluation were produced.

These liquid crystal displays were respectively disposed between polarizing plates arranged in Crossed-Nicol to observe, and it was found that the liquid crystal display in which the directions of coating of the ferroelectric liquid crystal were 0°, 5°, 85° and 90° with the direction of the alignment treatment conducted in the first alignment layer formation step were confirmed to be mono-stable ferroelectric liquid crystals having uniform mono-domain alignment.

Here, when a ferroelectric liquid crystal in which the ratio of the area of the regions where the normal line has the same direction was 80% or more of all areas, it is defined as "a ferroelectric liquid crystal having a uniform mono-domain alignment".

In the case of the liquid crystal displays in which the directions of coating of the ferroelectric liquid crystal were 0°, 5°, 85° and 90° with the direction of the alignment treatment conducted in the first alignment layer formation step, the areas occupied by the regions where the layer normal line had the same direction were 95%, 90%, 91% and 97%.

On the other hand, in the case of the liquid crystal displays in which the directions of coating of the ferroelectric liquid crystal were 10° and 80° with the direction of the alignment treatment conducted in the first alignment layer formation step, double domain alignment was partly observed. The areas occupied by the regions where the layer normal line had the same direction were 68% and 67%.

In the case of the liquid crystal displays in which the directions of coating of the ferroelectric liquid crystal were 30°, 45° and 60° with the direction of the alignment treatment conducted in the first alignment layer formation step, double domain alignment was confirmed. In the case of these liquid crystal displays, the areas occupied by the regions where the layer normal line had the same direction were both 55% or less.

Comparative Example 1

First, two glass substrates with an ITO electrode formed respectively thereon were thoroughly washed and a 2 wt % cyclopentanone solution of a photo dimerization type material (trade name: ROP-103, manufactured by Rolic Technologies Ltd.) was coated to the surfaces of these glass substrates by spin coating at a rotation of 1500 rpm for 15 seconds and then dried at 130° C. for 15 minutes. Then, the glass substrate was irradiated with linearly polarized ultraviolet rays at a dose of about 100 mJ/cm$^2$ to carry out alignment treatment.

Then, ferroelectric liquid crystals (trade name: R2301, manufactured by AZ Electronic Materials) were jetted in dot at intervals of 10 mm on one substrate by using an electromagnetic control type dispenser where the weight of one droplet was adjusted to about 0.15 mg.

Then, an ultraviolet/heat-curable sealing agent (trade name: WORLD ROCK 718, manufactured by Kyoritsu Chemical & Co., ltd.) was coated to the periphery of this liquid crystal side substrate by using a seal dispenser.

Next, a hot plate disposed in a vacuum chamber was heated to 110° C. and the liquid crystal side substrate on which the ferroelectric liquid crystal was coated was placed on the hot plate. Then, the other substrate was adsorbed by an adsorbing plate heated to 110° C. and, both of the substrates were made to face each other such that the directions of the alignment treatment of the alignment layers of these substrates were parallel to each other. In succession, the vacuum chamber was evacuated such that the pressure between both substrates was sufficiently reduced and under this condition, both substrates were stuck to each other and fixed pressure was applied to the both, followed by returning the pressure in the vacuum chamber to normal pressure. Then, ultraviolet rays were applied at a dose of 1 J/cm$^2$ to cure the ultraviolet-curable type sealing agent, thereby bonding both substrates to each other. Next, the liquid crystal cell is gradually cooled to room temperature to align the ferroelectric liquid crystals.

When the liquid crystal display was disposed between polarizing plates arranged in Crossed-Nicol to observe, it was found that lines were observed at the boundary where the ferroelectric liquid crystals that flowed after jetted were brought into contact each other.

Example 2

First, a glass substrate with an ITO electrode formed thereon was thoroughly washed and a transparent resist (trade name: NN780, manufactured by JSR Corporation) was coated to the surface of the glass substrate by spin coating, which was then dried under reduced pressure and pre-baked at 90° C. for 3 minutes. Then, the glass substrate was exposed to ultraviolet light at a dose of 100 mJ/cm$^2$ through a mask. The substrate was subsequently developed by an inorganic alkali solution and post-baked at 230° C. for 30 minutes. By the above process, a linear partition wall 1.5 μm in height and 3.0 mm pitch was formed.

Next, a 2 wt % cyclopentanone solution of a photo dimerization type material (trade name: ROP-103, manufactured by Rolic Technologies Ltd.) was coated to the surface of the glass substrate on which the linear partition wall was formed, by spin coating at a rotation of 1500 rpm for 15 seconds and then dried at 130° C. for 10 minutes. Then, the glass substrate was irradiated with linearly polarized ultraviolet rays at a dose of about 100 mJ/cm$^2$ to carry out alignment treatment. Moreover, a 2 wt % cyclopentanone solution of a polymerizable liquid crystal (trade name: ROF-5101, manufactured by Rolic Technologies Ltd.) was coated to the photo alignment layer using the photo-dimerization type material by spin coating, then dried at 55° C. for 3 minutes and then, irradiated with non-polarized ultraviolet rays at 55° C. at a dose of 1000 mJ/cm$^2$, to thereby obtain a liquid crystal side substrate.

Next, a glass substrate with an ITO electrode formed thereon was thoroughly washed and a 2 wt % cyclopentanone solution of a photo dimerization type material (trade name: ROP-102, manufactured by Rolic Technologies Ltd.) was coated to the surface of the glass substrate by spin coating at 1500 rpm for 15 seconds and then dried at 130° C. for 15 minutes. Then, the glass substrate was irradiated with linearly polarized ultraviolet rays at 25° C. at a dose of 100 mJ/cm$^2$ to carry out alignment treatment. At this time, the coating direction was designed to form angles of 0°, 5°, 10°, 30°, 45°, 60°, 80°, 85° and 90° with the longitudinal direction of the linear partition wall. A counter substrate was thus obtained.

Then, the liquid crystal side substrate was placed on a single axis stage set to room temperature (23° C.) and ferroelectric liquid crystals (trade name: R2301, manufactured by AZ Electronic Materials) were jetted in the state of an isotropic phase by using an ink jet device (trade name: SE-128, manufactured by Dimatix Inc.) at a frequency of about 3600 Hz for one second while moving the stage at a rate of about 60 mm/second, to form plural linear lines at intervals of 1.0 mm. At this time, the coating direction (direction of straight lines of a linear coating pattern) was designed to form angles of 0°, 5°, 10°, 30°, 45°, 60°, 80°, 85° and 90° with the direction of the alignment treatment and to also form an angle 0° to a longitudinal direction of the linear partition wall.

Then, an ultraviolet/heat-curable sealing agent (trade name: WORLD ROCK 718, manufactured by Kyoritsu Chemical & Co., ltd.) was coated to the periphery of this liquid crystal side substrate by using a seal dispenser.

Next, a hot plate disposed in a vacuum chamber was heated to 110° C. and the liquid crystal side substrate on which the ferroelectric liquid crystal was coated was placed on the hot plate. Then, the counter substrate was adsorbed by an adsorbing plate heated to 110° C. and then, the liquid crystal side substrate and the counter substrate were made to face each other such that the directions of the alignment treatment of the alignment layers of these substrates were parallel to each other. In succession, the vacuum chamber was evacuated such that the pressure between both substrates was sufficiently reduced and under this condition, both substrates were stuck to each other and fixed pressure was applied to the both, followed by returning the pressure in the vacuum chamber to normal pressure. Then, ultraviolet rays were applied at a dose of 1 J/cm$^2$ to cure the ultraviolet-curable type sealing agent, thereby bonding both substrates to each other. Next, the liquid crystal cell is gradually cooled to room temperature to align the ferroelectric liquid crystals. Thus, 9 types of devices for evaluation were produced.

These liquid crystal displays were respectively disposed between polarizing plates arranged in Crossed-Nicol to observe, and it was found that the liquid crystal display in which the directions of coating of the ferroelectric liquid crystal were 0°, 5°, 85° and 90° with the direction of the alignment treatment conducted in the first alignment layer formation step were confirmed to be mono-stable ferroelectric liquid crystals having uniform mono-domain alignment.

Here, similar to the Example 1, when a ferroelectric liquid crystal in which the ratio of the area of the regions where the normal line has the same direction was 80% or more of all areas, it is defined as "a ferroelectric liquid crystal having a uniform mono-domain alignment".

In the case of the liquid crystal displays in which the directions of coating of the ferroelectric liquid crystal were 0°, 5°, 85° and 90° with the direction of the alignment treatment conducted in the first alignment layer formation step, the areas occupied by the regions where the layer normal line had the same direction were 95%, 87%, 90% and 94%.

On the other hand, in the case of the liquid crystal displays in which the directions of coating of the ferroelectric liquid crystal were 10° and 80° with the direction of the alignment treatment conducted in the first alignment layer formation step, double domain alignment was partly observed. The areas occupied by the regions where the layer normal line had the same direction were 67% and 68%.

In the case of the liquid crystal displays in which the directions of coating of the ferroelectric liquid crystal were 30°, 45° and 60° with the direction of the alignment treatment conducted in the first alignment layer formation step, double domain alignment was confirmed. In the case of these liquid crystal displays, the areas occupied by the regions where the layer normal line had the same direction were both 55% or less.

Example 3

Nine types of liquid crystal displays were manufactured in the same manner as in Example 2 except that the ferroelectric liquid crystal was coated in the form of plural linear lines at intervals of 0.5 mm in Example 2.

These liquid crystal displays were respectively disposed between polarizing plates arranged in Crossed-Nicol to observe, and it was found that the liquid crystal display in which the directions of coating of the ferroelectric liquid crystal were 0°, 5°, 85° and 90° with the direction of the alignment treatment conducted in the first alignment layer formation step were confirmed to be mono-stable ferroelectric liquid crystals having uniform mono-domain alignment.

Here, similar to Example 1, when a ferroelectric liquid crystal in which the ratio of the area of the regions where the normal line has the same direction was 80% or more of all areas, it is defined as "a ferroelectric liquid crystal having a uniform mono-domain alignment".

In the case of the liquid crystal displays in which the directions of coating of the ferroelectric liquid crystal were 0°, 5°, 85° and 90° with the direction of the alignment treatment conducted in the first alignment layer formation step, the areas occupied by the regions where the layer normal line had the same direction were 95%, 85%, 87% and 93%.

On the other hand, in the case of the liquid crystal displays in which the directions of coating of the ferroelectric liquid crystal were 10° and 80° with the direction of the alignment treatment conducted in the first alignment layer formation step, double domain alignment was partly observed. The areas occupied by the regions where the layer normal line had the same direction were 67% and 65%.

In the case of the liquid crystal displays in which the directions of coating of the ferroelectric liquid crystal were 30°, 45° and 60° with the direction of the alignment treatment conducted in the first alignment layer formation step, double domain alignment was confirmed. In the case of these liquid crystal displays, the areas occupied by the regions where the layer normal line had the same direction were both 55% or less.

Example 4

Linear partition walls were formed on a glass substrate with an ITO electrode formed thereon in the same manner as in Example 2.

Next, a solution of a polyimide film (trade name: SE610, manufactured by Nissan Chemical Industries, Ltd.) was coated to the substrate on which the linear partition walls were formed, by spin coating at a rotation of 1000 rpm for 15 seconds and dried at 100° C. for 15 minutes. Then, the substrate was baked at 200° C. for one hour and subjected to rubbing treatment. Then, a 2 wt % cyclopentanone solution of a polymerizable liquid crystal material (trade name: ROF-5101, manufactured by Rolic Technologies Ltd.) was coated to the glass substrate processed by rubbing treatment, by spin coating and then dried at 55° C. for 3 minutes. The glass substrate was subsequently irradiated with non-linearly polarized ultraviolet rays at a dose of 1000 mJ/cm$^2$ at 55° C. Thus, a liquid crystal side substrate was obtained.

Next, a glass substrate with an ITO electrode formed thereon was thoroughly washed and a solution of a polyimide film (trade name: SE610, manufactured by Nissan Chemical Industries, Ltd.) was coated to the surface, of the glass substrate by spin coating at a rotation of 1000 rpm for 15 seconds and then dried at 100° C. for 15 minutes. The substrate was baked at 200° C. for one hour and rubbing treatment was conducted. At this time, the direction of the alignment treatment was designed to form angles of 0°, 5°, 10°, 30°, 45°, 60°, 80°, 85° and 90° with the longitudinal direction of the linear partition wall. A counter substrate was thus obtained.

Then, 9 liquid crystal displays were manufactured in the same manner as in Example 2.

These liquid crystal displays were respectively disposed between polarizing plates arranged in Crossed-Nicol to observe, and it was found the liquid crystal display in which the directions of coating of the ferroelectric liquid crystal were 0°, 5°, 85° and 90° with the direction of the alignment treatment conducted in the first alignment layer formation step were confirmed to be mono-stable ferroelectric liquid crystals having uniform mono-domain alignment.

Here, similar to Example 1, when a ferroelectric liquid crystal in which the ratio of the area of the regions where the normal line has the same direction was 80% or more of all areas, it is defined as "a ferroelectric liquid crystal having a uniform mono-domain alignment".

In the case of the liquid crystal displays in which the directions of coating of the ferroelectric liquid crystal were 0°, 5°, 85° and 90° with the direction of the alignment treatment conducted in the first alignment layer formation step, the areas occupied by the regions where the layer normal line had the same direction were 90%, 85%, 88% and 92%.

On the other hand, in the case of the liquid crystal displays in which the directions of coating of the ferroelectric liquid crystal were 10° and 80° with the direction of the alignment treatment conducted in the first alignment layer formation step, double domain alignment was partly observed. The areas occupied by the regions where the layer normal line had the same direction were 65% and 67%.

In the case of the liquid crystal displays in which the directions of coating of the ferroelectric liquid crystal were 30°, 45° and 60° with the direction of the alignment treatment conducted in the first alignment layer formation step, double domain alignment was confirmed. In the case of these liquid crystal displays, the areas occupied by the regions where the layer normal line had the same direction were both 55% or less.

The invention claimed is:

1. A process for producing a liquid crystal display, the process comprising:
    a liquid crystal side substrate preparation step including a first alignment layer formation step of forming a first alignment layer-formation layer on a first substrate on which a first electrode layer is formed and subjecting the first alignment layer-formation layer to alignment treatment to form a first alignment layer, to prepare a liquid crystal side substrate in which the first electrode layer and the first alignment layer are laminated in this order on the first substrate;
    a counter substrate preparation step including a second alignment layer formation step of forming a second alignment layer-formation layer on a second substrate on which a second electrode layer is formed and subjecting the second alignment layer-formation layer to alignment treatment to form a second alignment layer, to prepare a counter substrate in which the second electrode layer and the second alignment layer are laminated in this order on the second substrate;
    a liquid crystal coating step of linearly coating a ferroelectric liquid crystal to a surface of the first alignment layer of the liquid crystal side substrate in a direction substantially perpendicular or substantially parallel to a direction of the alignment treatment conducted in the first alignment layer formation step; and a substrate attaching step of providing the liquid crystal side substrate to which the ferroelectric liquid crystal is coated and the counter substrate to face each other such that the direction of the alignment treatment conducted in the first alignment layer formation step and a direction of the alignment treatment conducted in the second alignment layer formation step are substantially parallel to each other, and attaching the both substrates.

2. The process for producing a liquid crystal display according to claim 1, wherein:

the ferroelectric liquid crystal is warmed to a temperature at which the ferroelectric liquid crystal exhibits a nematic phase or an isotropic phase, before the ferroelectric liquid crystal is coated to the first alignment layer in the liquid crystal coating step; and a coating method of the ferroelectric liquid crystal is a jetting method.

3. The process for producing a liquid crystal display according to claim 2, wherein the jetting method is an ink jet method.

4. The process for producing a liquid crystal display according to claim 1, wherein a coating method of the ferroelectric liquid crystal is a screen printing method.

5. The process for producing a liquid crystal display according to claim 1, wherein the first alignment layer formation step is a step of: forming a layer to form an alignment layer for reactive liquid crystal on the first substrate on which the first electrode layer is formed, subjecting the layer to form an alignment layer for reactive liquid crystal to the alignment treatment to form an alignment layer for reactive liquid crystal, and then fixing a reactive liquid crystal to the alignment layer for reactive liquid crystal to form a fixed liquid crystal layer, wherein the alignment layer for reactive liquid crystal and the fixed liquid crystal layer are laminated to form the first alignment layer.

6. The process for producing a liquid crystal display according to claim 1, wherein the alignment treatment is photo alignment treatment.

7. The process for producing a liquid crystal display according to claim 1, wherein the alignment treatment is rubbing treatment.

8. The process for producing a liquid crystal display according to claim 1, wherein a composition of a constituent material for the first alignment layer is different from a composition of a constituent material for the second alignment layer and the ferroelectric liquid crystal is interposed therebetween.

9. The process for producing a liquid crystal display according to claim 1, wherein:

a linear partition wall formation step of forming plural linear partition walls on the first substrate is carried out prior to the first alignment layer formation step in the liquid crystal side substrate preparation step;

the alignment treatment is conducted in a direction substantially perpendicular or substantially parallel to a longitudinal direction of the linear partition wall in the first alignment layer formation step; and the ferroelectric liquid crystal is coated in a form of plural linear lines in the direction substantially parallel to the longitudinal direction of the linear partition wall between the linear partition walls adjacent to each other in the liquid crystal coating step.

* * * * *